US011693373B2

(12) United States Patent
Shi et al.

(10) Patent No.: US 11,693,373 B2
(45) Date of Patent: Jul. 4, 2023

(54) SYSTEMS AND METHODS FOR ROBUST LEARNING-BASED CONTROL DURING FORWARD AND LANDING FLIGHT UNDER UNCERTAIN CONDITIONS

(71) Applicant: California Institute of Technology, Pasadena, CA (US)

(72) Inventors: Guanya Shi, Pasadena, CA (US); Xichen Shi, Sunnyvale, CA (US); Michael O'Connell, Pasadena, CA (US); Animashree Anandkumar, Pasadena, CA (US); Yisong Yue, Glendale, CA (US); Soon-Jo Chung, La Cañada, CA (US)

(73) Assignee: California Institute of Technology, Pasadena, CA (US)

( * ) Notice: Subject to any disclaimer, the term of this patent is extended or adjusted under 35 U.S.C. 154(b) by 677 days.

(21) Appl. No.: 16/709,775

(22) Filed: Dec. 10, 2019

(65) Prior Publication Data
US 2020/0183339 A1 Jun. 11, 2020

Related U.S. Application Data

(60) Provisional application No. 62/777,646, filed on Dec. 10, 2018.

(51) Int. Cl.
*G05B 13/02* (2006.01)
*G06N 3/04* (2023.01)
*G06N 3/084* (2023.01)

(52) U.S. Cl.
CPC ............ *G05B 13/027* (2013.01); *G06N 3/04* (2013.01); *G06N 3/084* (2013.01)

(58) Field of Classification Search
CPC .................................. G06N 20/00; G06N 3/02
USPC ............................. 706/25; 455/450; 544/252
See application file for complete search history.

(56) References Cited

U.S. PATENT DOCUMENTS

| 6,473,746 B1 * | 10/2002 | Zakrzewski | ........ G06F 11/3608 706/15 |
| 2018/0018587 A1 * | 1/2018 | Kobayashi | ............... G06N 5/04 |
| 2018/0114113 A1 * | 4/2018 | Ghahramani | .......... G06N 7/005 |
| 2018/0194490 A1 * | 7/2018 | Chen | .................... F16M 11/123 |

(Continued)

OTHER PUBLICATIONS

Abbeel et al., "Autonomous Helicopter Aerobatics through Apprenticeship Learning", The International Journal of Robotics Research, Jun. 23, 2010, vol. 29, No. 13, pp. 1608-1639, https://doi.org/10.1177/0278364910371999.

(Continued)

*Primary Examiner* — Kiet M Doan
(74) *Attorney, Agent, or Firm* — KPPB LLP

(57) ABSTRACT

Systems and methods for learning based control in accordance with embodiments of the invention are illustrated. One embodiment includes a method for training an adaptive controller. The method includes steps for receiving a set of training data that includes several training samples, wherein each training sample includes a state and a true uncertain effect value. The method includes steps for computing an uncertain effect value based on the state, computing a set of one or more losses based on the true uncertain effect value and the computed uncertain effect value, and updating the adaptive controller based on the computed set of losses.

18 Claims, 12 Drawing Sheets

(56) References Cited

U.S. PATENT DOCUMENTS

2020/0125877 A1\* 4/2020 Phan ................ G06N 3/04
2020/0311418 A1\* 10/2020 Mahadeswaraswamy ..................
H04N 9/3167

OTHER PUBLICATIONS

Balakrishnan et al., "Neurocontrol: A Literature Survey", Mathematical Computer Modelling, 1996, vol. 23, No. 1/2, pp. 101-117.
Bandyopadhyay et al., "Nonlinear attitude control of spacecraft with a large captured object", Journal of Guidance, Control, and Dynamics, Apr. 4, 2016, vol. 39, No. 4, pp. 754-769, doi: 10.2514/1. G001341.
Bansal et al., "Learning Quadrotor Dynamics Using Neural Network for Flight Control", IEEE 55th conference on Decision and Control, Dec. 2016, pp. 4653-4660.
Bartlett et al., "Spectrally-normalized margin bounds for nerual networks", Advances in Neural Information Processing Systems, 2017, pp. 6240-6249, arXiv:1706.08498.
Berkenkamp et al., "Safe Controller Optimization for Quadrotors with Gaussian Processes", Proc. of the IEEE International Conference on Robotics and Automation, 2016, pp. 493-496.
Berkenkamp et al., "Safe model-based reinforcement learning with stability guarantees", in Proc. of Neural Information Processing Systems, 2017, pp. 1-20, arXiv.org/abs/1705.08551.
Cheeseman et al., "The Effect of the Ground on a Helicopter Rotor in Forward Flight", Ministry of Supply, Aeronautical Research Council Reports and Memoranda, 1957, 12 pgs.
Chung et al., "Phase synchronization control of complex networks of Langrangian systems on adaptive digraphs", Automatica, May 2013, vol. 49, Issue 5, pp. 1148-1161, doi:10.1016/j.automatica. 2013.01.148.
Cosgrove, "Spectral Normalization Explained", Ode to Gradients, Jan. 4, 2018, 11 pgs.
Danjun et al., "Autonomous Landing of Quadrotor based on Ground Effect Modelling", American Control Conference, Sep. 2015, pp. 5647-5652.
Dziugainte et al., "Computing Nonvacuous Generalization Bounds for Deep (Stochastic) Neural Networks with Many More Parameters than Training Data", arXiv preprint arXiv:1703.11008, 2017, 10 pgs.
Frye et al., "Direct Inverse Control using an Artificial Neural Network for the Autonomous Hover of a Helicopter", 2014 IEEE International Conference on Systems, Man and Cybernetics, Oct. 2014, pp. 4121-4122.
He et al., "Deep residual learning for image recognition", arXiv:1512. 03385 [cs.CV], in 2016 IEEE Conference on Computer Vision and Pattern Recognition, Dec. 10, 2015, pp. 1-12.
Krizhevsky et al., "ImageNet Classification with Deep Convolutional Neural Networks", Advances in Neural Information Processing Systems (NIPS 2012), vol. 25, 2012, pp. 1097-1105.
Li et al., "Deep Neural Networks for Improved, Impromptu Trajectory Tracking of Quadrotors", IEEE International Conference on Robotics and Automation, 2017, pp. 5183-5189.
Miyato et al., "Spectral Normalization for Generative Adversarial Networks", International Conference on Learning Representations, Feb. 2018, arXif:1802.059557, Feb. 16, 2018, 26 pgs.
Morgan et al., "Swarm Assignment and Trajectory Optimization Using Variable-Swarm, Distributed Auction Assignment and Sequential Convex Programming", The International Journal of Robotics Research, 2016, vol. 35, No. 10, pp. 1261-1285.
Neyshabur et al., "A PAC-bayesian approach to spectrally-normalized margin bounds for neural networks", arXiv:1707.09564 [cs.LG], Feb. 23, 2018, 9 pgs.
Neyshabur et al., "Exploring Generalization in Deep Learning", in Advances in Neural Information Processing Systems, 2017, pp. 5947-5956, arXiv:1706.08947 [cs.LG] Jul. 6, 2017.
Nonaka et al., "Integral Sliding Mode Altitude Control for a Small Model Helicopter with Ground Effect Compensation", 2011 American Control Conference, Jun. 29-Jul. 1, 2011, pp. 202-207.
Paszke et al., "Automatic differentiation in PyTorch", 31st Conference on Neural Information Processing Systems (NIPS 2017), 4 pgs.
Punjani et al., "Deep Learnig Helicopter Dynamics Models", IEEE, International Conference on Robotics and Automation, 2015, pp. 3223-3230.
Salimans et al., "Weight Normalization: A Simple Reparameterization to Accelerate Tranining of Deep Neural Networks", Advances in Neural Information Processing Systems, 2016, pp. 901-909.
Sanchez-Sanchez et al., "Real-time optimal control via deep neural networks: study on landing problems", Journal of Guidance, Control and Dynamics, 2018, vol. 41, No. 5, pp. 1122-1135.
Shi et al., "Nonlinear Control of Autonomous Flying Cars with Wings and Distributed Electric Propulsion", in 2018 IEEE Conference of Decision and Control (CDC), 2018, pp. 5326-5333, DOI: 10.1109/CDC.2018.8619578.
Slotine et al., "Applied Nonlinear Control", Prentice Hall, 1991, 475 pgs., (presented in three parts).
Suprijono et al., "Direct inverse control based on neural network for unmanned small helicopter attitude and altitude control", Journal of Telecommunication, Electronic and Computer Engineering, 2017, vol. 9, No. 2-2, pp. 99-102.
Zhang et al., "Understanding Deep Learning Requires Re-Thinking Generalization", arXiv:1611.03530v2 [cs.LG] Feb. 26, 2017, 15 pgs.
Zhou et al., "Design of Deep Neural Networks as Add-on Blocks for Improving Impromptu Trajectory Tracking", IEEE 56th Conference on Decision and Control, 2017, pp. 5201-5207.

\* cited by examiner

```
1: procedure META-LEARNING({D_i})
2:     initialize Θ_0 randomly, k = 0                    ▷ Θ*
3:     repeat
4:         for i ∈ {1,...,T} do
5:             (D_i^a, D_i^Θ) ← random split D_i
6:             Θ_{k+1} = Θ_k
                   −β · ∇_{Θ_k} J_i(α_LS(Θ_k, D_i^a), Θ_k, D_i^Θ)
7:         end for
8:         k ← k + 1
9:     until converged
10:    end procedure
11:    return Θ_k
```

FIG. 4

| Trajectory | Kernel | Mean error metric | | |
|---|---|---|---|---|
| | | $\|e_1\|$ (N) | $\|s\|$ (m/s) | $\|q - q_d\|$ (m) |
| Hover | constant | 0.75 | 0.11 | 0.13 |
| | vector | 0.72 | 0.12 | 0.13 |
| | scalar | 0.71 | 0.11 | 0.12 |
| Set point | constant | 1.58 | 0.63 | 0.25 |
| | vector | 1.45 | 0.61 | 0.24 |
| | scalar | 1.42 | 0.60 | 0.24 |
| Figure 8 | constant | 0.91 | 0.24 | 0.20 |
| | vector | 0.74 | 0.26 | 0.22 |
| | scalar | 0.75 | 0.25 | 0.21 |

FIG. 5

SYSTEMS AND METHODS FOR ROBUST LEARNING-BASED CONTROL DURING FORWARD AND LANDING FLIGHT UNDER UNCERTAIN CONDITIONS

CROSS-REFERENCE TO RELATED APPLICATIONS

The present application claims the benefit of and priority under 35 U.S.C. § 119(e) to U.S. Provisional Patent Application No. 62/777,646 entitled "Neural Lander: Stable Drone Landing Control Using Learned Dynamics" filed Dec. 10, 2018. The disclosure of U.S. Provisional Patent Application No. 62/777,646 is hereby incorporated by reference in its entirety for all purposes.

STATEMENT OF FEDERALLY SPONSORED RESEARCH

This invention was made with government support under Grant No. HR0011-18-9-0035 awarded by DARPA. The government has certain rights in the invention.

FIELD OF THE INVENTION

The present invention generally relates to controller systems and more specifically relates to controller systems that utilize deep neural networks.

BACKGROUND

Control systems can be used to manage or otherwise control a device (or plant), such as unmanned aerial vehicles (UAV), robotic systems, autonomous cars, etc. Control systems can adjust control inputs based on desired objectives. Feedback control systems can adjust control inputs based on output (or feedback) from the controlled device, in addition to the desired objectives. However, when a device is affected by random or complex environmental variables (e.g., weather), it can be difficult to model such variables, leading to poor performance in dynamic conditions.

SUMMARY OF THE INVENTION

Systems and methods for learning based control in accordance with embodiments of the invention are illustrated. One embodiment includes a method for training an adaptive controller. The method includes steps for receiving a set of training data that includes several training samples, wherein each training sample includes a state and a true uncertain effect value. The method includes steps for computing an uncertain effect value based on the state, computing a set of one or more losses based on the true uncertain effect value and the computed uncertain effect value, and updating the adaptive controller based on the computed set of losses.

In a further embodiment, the true uncertain effect value is a disturbance force caused by at least one of the group consisting of ground effects and wind conditions.

In still another embodiment, the adaptive controller includes a set of one or more deep neural network (DNNs).

In a still further embodiment, updating the adaptive controller includes backpropagating the computed set of losses through the set of DNNs.

In yet another embodiment, updating the adaptive controller includes updating at least one layer of the set of DNNs using spectrally normalized weight matrices.

In a yet further embodiment, updating the adaptive controller includes updating each layer of the set of DNNs using spectrally normalized weight matrices to constrain the Lipschitz constant of the set of DNNs.

In another additional embodiment, computing the set of losses includes computing at least one of a group consisting of a position tracking error and a prediction error.

In a further additional embodiment, the desired state includes at least one of the group consisting of an attitude, a global position, and a velocity.

In another embodiment again, computing an uncertain effect value of an environment includes determining a set of kernel functions that approximate the uncertain effect value.

In a further embodiment again, the adaptive controller includes a set of one or more deep neural networks (DNNs) with Rectified Linear Units (ReLU) activation. Computing an uncertain effect value of an environment includes determining a set of kernel functions that approximate the uncertain effect value utilizing the set of DNNs, and updating the adaptive controller includes updating each layer of the set of DNNs using spectrally normalized weight matrices to constrain the Lipschitz constant of the set of DNNs.

One embodiment includes a method for online adaptation of an adaptive controller. The method includes steps for receiving a set of inputs that includes a desired state for a quadrotor, predicting uncertain effects using a model includes several layers, generating control inputs based on the predicted uncertain effects, receiving updated state, computing a set of one or more losses based on the updated state and the desired state, and updating a subset of the several layers of the model based on the computed loss.

In still yet another embodiment, the uncertain effects includes a disturbance force caused by at least one of the group consisting of ground effects and wind conditions.

In a still yet further embodiment, the model includes a set of one or more deep neural networks (DNNs), wherein updating the model includes backpropagating the computed set of losses through the set of DNNs.

In still another additional embodiment, updating the model includes updating weights for only one layer of the set of DNNs.

In a still further additional embodiment, updating weights for the only one layer includes using spectrally normalized weight matrices.

In still another embodiment again, updating the model includes updating each layer of the set of DNNs using spectrally normalized weight matrices to constrain the Lipschitz constant of the set of DNNs.

In a still further embodiment again, computing the set of losses includes computing at least one of a group consisting of a position tracking error and a prediction error.

In yet another additional embodiment, the input includes a desired state for the quadrotor and a current state for the quadrotor, wherein the state for the quadrotor includes at least one of the group consisting of an attitude, a global position, and a velocity.

In a yet further additional embodiment, predicting uncertain effects includes determining a set of kernel functions that approximate the uncertain effects.

In yet another embodiment again, the model includes a set of one or more deep neural networks (DNNs) with Rectified Linear Units (ReLU) activation. The method includes steps for predicting an uncertain effects includes determining a set of kernel functions that approximate the uncertain effect value utilizing the set of DNNs, and updating the adaptive controller includes updating each layer of the set of DNNs using spectrally normalized weight matrices to constrain the Lipschitz constant of the set of DNNs.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

FIG. 4 illustrates an example of a meta-learning procedure in accordance with an embodiment of the invention.

FIG. 5 illustrates examples of prediction error, composite velocity tracking errors, and position tracking errors for kernel functions and trajectories in accordance with an embodiment of the invention.

DETAILED DESCRIPTION

For a given dynamical system, complexity and uncertainty can arise either from its inherent property or the changing environment. Thus model accuracy is often key in designing a high-performance and robust control system. If the model structure is known, conventional system identification techniques can be used to resolve the parameters of the model. When the system becomes too complex to model analytically, modern machine learning research conscripts data-driven and neural network approaches that often result in bleeding-edge performance, given enough samples, proper tuning, and adequate time for training. However, a learning-based control system can simultaneously call for both representation power and fast execution. Adaptive control is a control method that can be used by controllers to adapt a controlled system with uncertain parameters. Successes in adaptive control have been seen using simple linear-in-parameter models with provably robust control designs. On the other hand, the field of machine learning has made its own progress toward a fast online paradigm, with rising interest in few-shot learning, continual learning, and meta learning.

Figure 1:
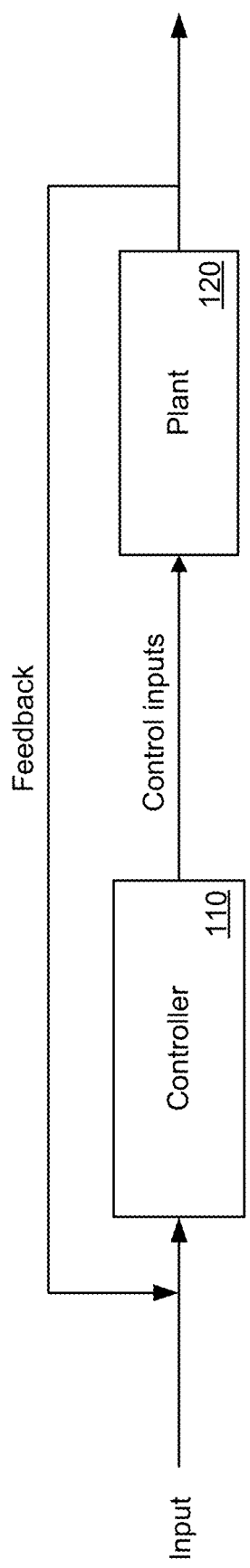
FIG. 1 illustrates an example of a control system in accordance with an embodiment of the invention.

An example of a control system in accordance with an embodiment of the invention is illustrated in FIG. 1. In this example, control system 100 includes controller 110 and plant 120. Controllers in accordance with various embodiments of the invention can include various computing devices, such as (but not limited to) onboard computers, server systems, and/or other computing devices. In numerous embodiments, plants can include (but are not limited to) autonomous vehicles, unmanned aerial vehicles (UAVs), and/or robots.

Controller 110 receives inputs as well as feedback to generate control inputs for controlling plant 120. Inputs in accordance with some embodiments of the invention can describe a desired state and/or trajectory for the plant. In many embodiments, feedback can include various data on the actual slate of the plant, such as (but not limited to) global position, velocity, acceleration, elevation, and/or altitude. Feedback in accordance with many embodiments of the invention can be measured through sensor readings (e.g., accelerometer, gyroscope, global positioning system (GPS), imaging systems, etc.) of the plant and/or other external sensors.

Controllers in accordance with numerous embodiments of the invention can utilize the received input and/or feedback to generate control inputs for controlling plants, which can then generate additional feedback that can be used by a controller to generate additional control inputs for the plant. In order to generate control inputs, controllers in accordance with a variety of embodiments of the invention can approximate the environment (or system) within which a plant operates, allowing the controller to predict conditions and adjust the control inputs for a plant. System approximation in accordance with numerous embodiments of the invention can be performed using a deep neural network (DNN) trained to approximate (or predict) uncertain conditions in the control system. DNNs for approximating uncertain conditions in accordance with certain embodiments of the invention use Rectified Linear Unit (ReLU) activation, which can converge faster during training and often demonstrate more robust behavior with respect to changes in hyperparameters. Alternatively, or conjunctively, DNNs in accordance with numerous embodiments of the invention can use other activation functions such as, but not limited to, sigmoid, tanh, etc.

A particular interesting scenario for a control system in a changing environment is a multi-rotor flying in varying wind conditions. Classic multi-rotor control docs not consider the aerodynamic forces such as drag or ground effects. The thruster direction is controlled to follow the desired acceleration along a trajectory. To account for aerodynamic forces in practice, an integral term is often added to the velocity controller. Other works use incremental nonlinear dynamic inversion (INDI) to estimate external force through filtered accelerometer measurements, and then apply direct force cancellation in the controller. Some works have assumed a diagonal rotor drag model and proved differential flatness of the system for cancellation, while others used a nonlinear aerodynamic model for force prediction. When a linear-inparameter (LIP) model is available, adaptive control theories can be applied for controller synthesis. This does not limit the model to only physics-based parameterizations, and a neural network basis can be used. Such models have been applied to multi-rotor for wind disturbance rejection.

As another example, Unmanned Aerial Vehicles (UAVs) often require high precision control of aircraft positions, especially during landing and take-off. This problem is challenging largely due to complex interactions of rotor and wing airflows with the ground. The aerospace community has long identified such ground effect that can cause an increased lift force and a reduced aerodynamic drag. These effects can be both helpful and disruptive in flight stability, and the complications are exacerbated with multiple rotors. Therefore, performing automatic landing of UAVs is risk-prone, and can often require expensive high-precision sensors as well as carefully designed controllers. Compensating for ground effect is a long-standing problem in the aerial robotics community. Prior work has largely focused on mathematical modeling as part of system identification (ID). These models are later used to approximate aerodynamics forces during flights close to the ground and combined with controller design for feed-forward cancellation. However, many existing theoretical ground effect models are derived based on steady-flow conditions, whereas most practical cases exhibit unsteady flow. Alternative approaches, such as integral or adaptive control methods, often suffer from slow response and delayed feedback. Some methods employs Bayesian Optimization for open-air control but not for take-off/landing. Given these limitations, the precision of existing fully automated systems for UAVs are still insufficient for landing and take-off, thereby necessitating the guidance of a human UAV operator during those phases.

When adapting to complex system dynamics or a fast changing environment, a system model needs a high degree of representation power to represent the system accurately, which makes a deep neural network (DNN) an desirable candidate. However, there can be several issues associated with using a deep network for adaptive control purposes, For example, training a DNN often requires back propagation, easily leading to a computation bottleneck for realtime control on small drones. It can also be challenging to collect sufficient real-world training data, as DNNs are notoriously data-hungry. In addition, continual online training may incur catastrophic inference where previously learned knowledge is forgotten unintentionally. Due to high-dimensionality, DNNs can be unstable and generate unpredictable output, which makes the system susceptible to instability in the feedback control loop, as a vanilla network for a regression problem often does not have guarantees on desirable properties for control design, such as output boundedness and Lipschitz continuity. Further DNNs are often difficult to analyze, which makes it difficult to design provably stable DNN-based controllers without additionally requiring a potentially expensive discretization step and relying on the native Lipschitz constant of the DNN.

Training an Adaptive Controller

Systems and methods in accordance with several embodiments of the invention can provide online composite adaptive control based on deep neural networks (DNNs). Controllers in accordance with numerous embodiments of the invention can model an environment to generate control inputs that account for effects of the environment (e.g., aerodynamic interactions) on the control of the plant. While some aspects of an environment can be mathematically modeled, complex environments can often include various aspects that are difficult to model with traditional methods. To capture complex aerodynamic interactions without overly-constrained conventional modeling assumptions, processes in accordance with several embodiments of the invention can utilize a machine-learning (ML) approach to build a black-box dynamics model using DNNs.

In some embodiments, the unknown part of a dynamics model can be approximated with a DNN trained offline with previously collected data. Processes in accordance with a variety of embodiments of the invention can utilize small, randomly sampled subsets of the training examples with different uncertain effects (e.g., wind conditions, ground effects, etc.) to learn kernel functions that can approximate various uncertain effects. In a variety of embodiments, adaptive controllers can be trained with constrained weight matrices generate stable and predictable outputs that allow for smooth and accurate control of the plant.

Figure 2:
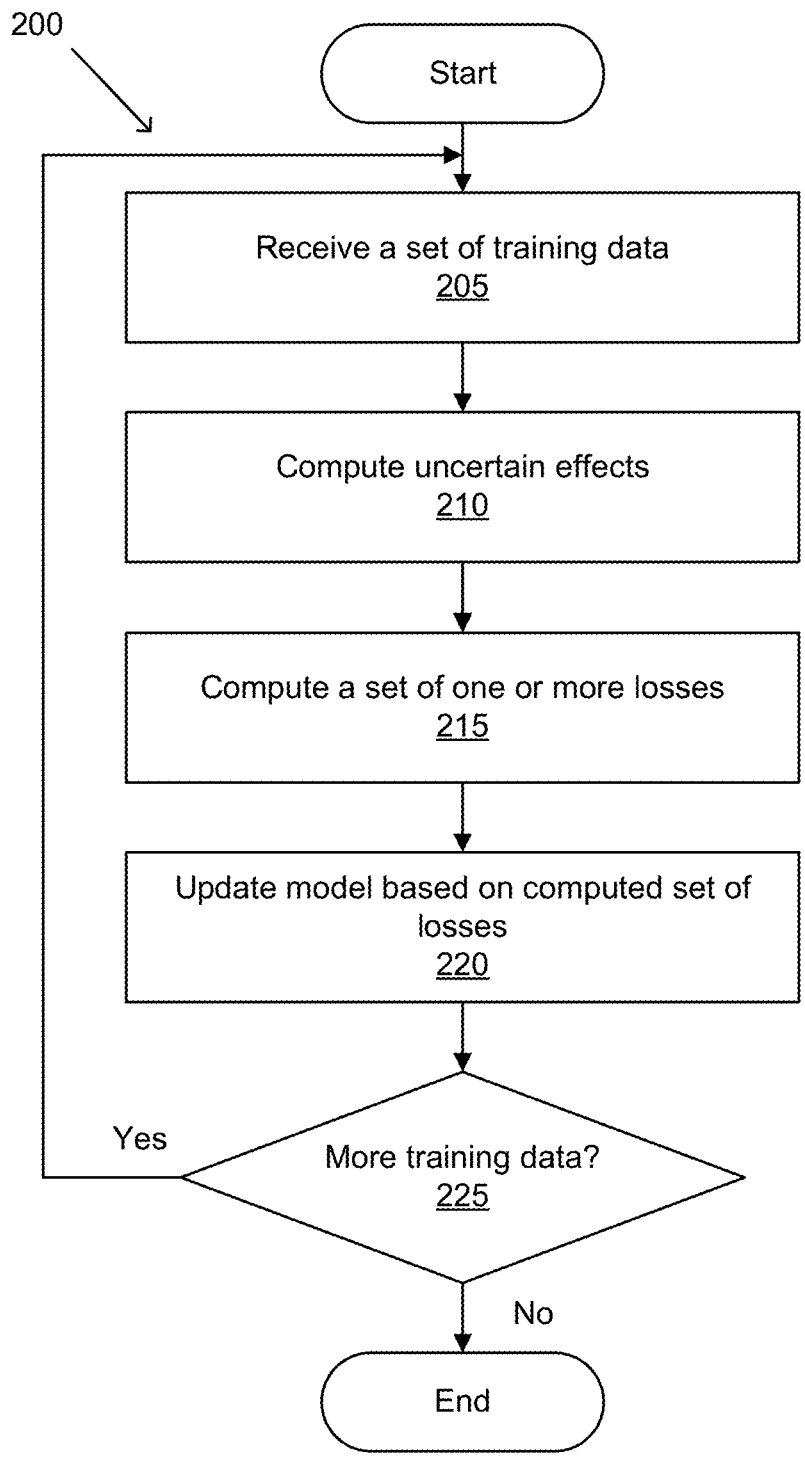
FIG. 2 conceptually illustrates an example of a process for training a stable adaptive controller in accordance with an embodiment of the invention.

A process for training a stable adaptive controller in accordance with an embodiment of the invention is conceptually illustrated in FIG. 2. Process 200 receives (205) a set of training data. In certain embodiments, the set of training data can include multiple sub training data sets that are captured in various environmental conditions. Training data in accordance with a variety of embodiments of the invention can include state and force measurement pairs captured in various environmental conditions.

Process 200 computes (210) uncertain effects. Uncertain effects in accordance with a variety of embodiments of the invention can include (but are not limited to) ground effects, wind conditions, and other disturbance forces. In a variety of embodiments, processes can compute (or predict) uncertain effects using a set of one or more DNNs initialized with random weights, which are updated by the training process. In a number of embodiments, the process generates a set of parameters, such that a linear combination of neural net kernels can represent certain effects with small error.

Process 200 computes (215) a set of one or more losses based on the measured effects. Losses in accordance with a number of embodiments of the invention can include position tracking errors, prediction error, etc. In numerous embodiments, a composite loss composed of multiple different errors can be computed.

Process 200 updates (220) the model based on the computed set of losses. In numerous embodiments, backpropagation can be used to update weights of a deep neural network. Processes in accordance with a variety of embodiments of the invention can update weights of one or more layers of the set of DNNs using spectrally normalized weight matrices. As described below, using spectrally normalized weight matrices for every layer of the DNN can constrain the Lipschitz constant of the set of DNNs, allowing for stable and predictable outputs from the controller.

In several embodiments, DNNs for the uncertain effects can be trained using meta-learning processes that allow deeper layers of the network to capture internal features that are more generally applicable to predicting a variety of different uncertain effects. In various embodiments, training processes can employ model-agnostic meta-learning (MAML) techniques can be used to train adaptive controller models. MAML techniques can facilitate hidden layer outputs becoming good basis functions for online adaptation. In many embodiments, processes can split parameters of neural networks into internal and output layer parameters, with a focus on training the internal layer parameters such that the output layer parameters can be changed to represent a large class of uncertain conditions. In a variety of embodiments, processes can use meta-training data $D_{meta}=\{D_1, D_2, \ldots, D_T\}$, with T sub datasets, where each sub dataset $D_i$ includes $L_i$ state and force measurement pairs, $([q_k, \dot{q}_k], \hat{f}(q_k, \dot{q}_k, c_i))$, generated from some fixed but unknown system condition (e.g., wind speed, ground effects, etc.), represented by $c_i$. The goal of meta-learning is to generate a set of parameters, $\Theta = \{\theta_i\}_{i=1}^m$, such that a linear combination of the neural net kernels, $\{\varphi_i\}_{i=1}^m$, can represent any wind condition with small error. Meta learning is described in greater detail below.

Process 200 determines (225) whether there is more training data. When the process determines that there is more training data, the process returns to step 205 to receive more training data. In several embodiments, each set of training data is a subset of a larger training corpus, where each set includes training data captured in a different environmental condition (e.g., wind speeds). Otherwise, the process ends.

Systems and methods in accordance with numerous embodiments of the invention provide a learning-based controller that can improve the precision of quadrotor landing with guaranteed stability. Controllers in accordance with many embodiments of the invention can directly learn the ground effect on coupled unsteady aerodynamics and vehicular dynamics. In several embodiments, deep learning can be used for system ID of residual dynamics and then integrated with nonlinear feedback linearization control. Although many of the examples described herein describe applications to quadrotors, one skilled in the art will recognize that similar systems and methods can be used in a variety of multi-copter systems, including (but not limited to) hexacopters and octacopters, without departing from this invention.

Adaptive controllers in accordance with same embodiments of the invention can be used to control a quadrotor during take-off, landing and cross-table maneuvers. Adaptive controllers in accordance with many embodiments of the invention have been shown to be able to land a quadrotor much more accurately than a Baseline Nonlinear Tracking Controller with a pre-identified system, decreasing error in the z axis and mitigating x and y drifts by as much as 90%, in the landing case. In several embodiments, the learned model can handle temporal dependency, and is an improvement over the steady-state theoretical models.

Figure 3:
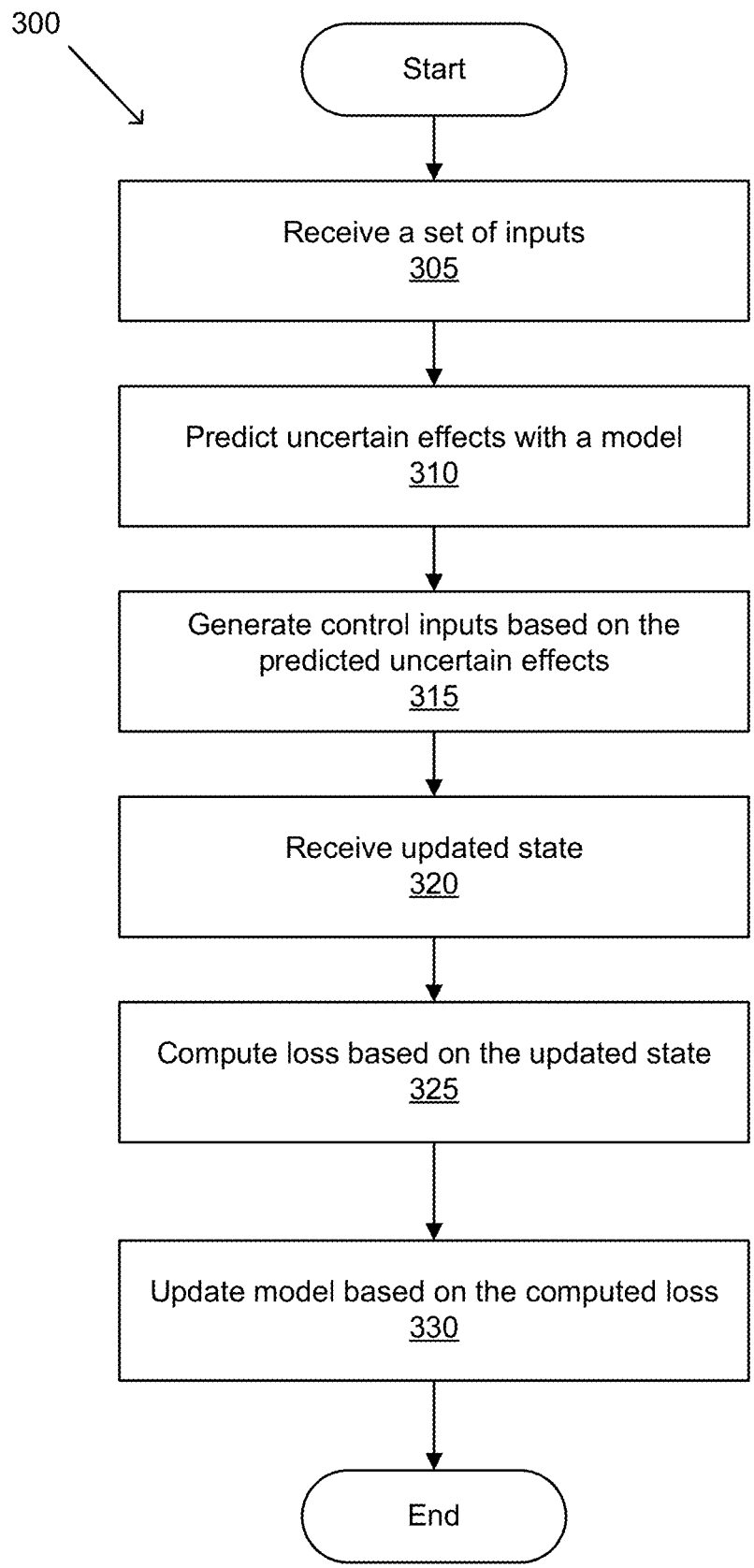
FIG. 3 conceptually illustrates an example of a process for training an adaptive online controller in accordance with an embodiment of the invention.

Processes in accordance with some embodiments of the invention can train a model offline (e.g., using a process similar to that described with reference to FIG. 2) and allow for further online updates to allow the model to adapt to changing environmental conditions. A process for training an adaptive online controller in accordance with an embodiment of the invention is conceptually illustrated in FIG. 3. Process 300 receives (305) a set of inputs. Inputs in accordance with certain embodiments of the invention can include (but are not limited to) a desired position, velocity, trajectory, and/or feedback that describes a current state of a plant.

Process 300 predicts (310) uncertain effects such as (but not limited to) wind conditions, ground effects, and/or other disturbance forces using a model. In a variety of embodiments, the model includes a set of one or more DNNs that are trained offline to predict disturbance forces based on training data. DNNs in accordance with some embodiments of the invention can be trained with constrained weight matrices (e.g., spectrally normalized weight matrices) that can be used control the outputs generated by the set of DNNs. In a number of embodiments, models can generate a set of parameters, such that a linear combination of neural net kernels can represent uncertain effects with small error.

Process 300 generates (315) control inputs based on the predicted uncertain effects. Control inputs in accordance with several embodiments of the invention can include various control signals for controlling a plant. In certain embodiments, control inputs can include (but are not limited to) thrust commands, attitude commands, and/or squared rotor speeds.

Process 300 receives (320) updated state data for the plant. Updated state in accordance with a number of embodiments of the invention can be received and/or computed from data received from sensors of a plant and/or from sensors external to the plant. In a number of embodiments, sensors can include (but not limited to) accelerometers, gyroscopes, altimeters, cameras, global positioning service (GPS), etc.

Process 300 computes (325) a set of one or more losses based on the updated state. Losses in accordance with a number of embodiments of the invention can include position tracking errors, prediction error, etc. In numerous embodiments, a composite loss composed of multiple different errors can be computed.

Process 300 updates (330) the model based on the computed losses. Processes in accordance with numerous embodiments of the invention can update only the last layer weights in a fashion similar to composite adaptive control, or update the last layer's weights more frequently than the rest of the network. This can enable the possibility of fast adaptation without incurring high computation burden. In several embodiments, the online training process is performed continuously with changing conditions. Alternatively, or conjunctively, the online training process can be performed periodically.

While specific processes for training an adaptive controller are described above, any of a variety of processes can be utilized as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. In numerous embodiments, processes can include steps for offline training in combination with steps for online training.

In several embodiments, DNNs can be trained with layer-wise spectrally normalized weight matrices. Network weights in accordance with several embodiments of the invention can be spectrally normalized during training and/or online adaptation, to constrain the Lipschitz constant of a system approximator, which can be a necessary condition for stable control design. The resulting controller can be shown to be globally exponentially stable under bounded learning errors by exploiting the Lipschitz bound of spectrally normalized DNNs.

Problem Statement

Mixed Model for Robot Dynamics
Consider the general robot dynamics model:

$$H(q)\ddot{q} + C(q,\dot{q})\dot{q} + g(q) + f(q,\dot{q};c) = \tau \qquad (1)$$

where $q, \dot{q}, \ddot{q} \in \mathbb{R}^n$ are the n dimensional position, velocity, and acceleration vectors, $H(q)$ is the symmetric, positive definite inertia matrix, $C(q,\dot{q})\dot{q}$ is the centripetal and Coriolis torque vector, $g(q)$ is the gravitational torque vector, $f(q,\dot{q};c)$ incorporates unmodeled dynamics, and $c = c(t)$ is the hidden state used to represent changing environment.

In several embodiments, systems approximators can approximate unmodeled (or uncertain) dynamics terms with a linear combination of a set of m neural network kernels. Two formulations are considered here. First, $f(q,\dot{q};c)$ can be approximated by linearly combining m outputs from m separately trained neural networks $\vec{\varphi}_i: \mathbb{R}^n \times \mathbb{R}^n \to \mathbb{R}^n$ parameterized by $\theta_i$:

$$f(q, \dot{q}; c) \approx \sum_{i=1}^{m} a_i(c)\vec{\varphi}_i(q, \dot{q}; \theta_i) = \varphi(q, \dot{q}; \Theta)a(c) \quad (2)$$

where $a(c)=[a_i(c)] \in \mathbb{R}^n$ and the kernels are stacked such that $\varphi(q,\dot{q}; \Theta)=[\vec{\varphi}(q,\dot{q},\theta_i)_i]$ and $\Theta=[\theta_i]$. In some embodiments, $a(c)$ can be a set of parameters that implicitly encodes the dependence of $f_a$ on the environmental conditions, c. Recall that $f_a$ is assumed to be a function of the state, q and $\dot{q}$, and environmental conditions, c. It can be further assumed that the dependence can be linearly separated as $f_a(q,\dot{q};c)=a(c)\phi(q,\dot{q})$. In a number of embodiments, for fixed kernel or basis functions, $\phi$, and a given c, a(c) is taken as the best least squares estimator of $f_a$, so a(c) is implicitly a function of the data for $f_a$, which is itself a function of the conditions c. The goal of meta learning can be to learn the best set of basis functions $\phi$ under this separability assumption, and the adaptive control formulation in accordance with certain embodiments of the invention can adapt a to the current environment conditions online.

Second, consider the alternative formulation where $f(q,\dot{q};c)$ is approximated with a single neural network, where a represents the weights of its last layer, and $\{\varphi_i\}$ represent the hidden states before the last layer. This can be explicitly written as $$f(q, \dot{q}; c) \approx \sum_{i=1}^{m}\sum_{j=1}^{n} a_{i,j}(c)\varphi_i(q, \dot{q}; \theta_i)\hat{e}_j = \varphi(q, \dot{q}; \Theta)a(c) \quad (3)$$

$$\varphi(q, \dot{q}; \Theta) \triangleq \begin{bmatrix} [\varphi_i]^T & 0 & 0 \\ 0 & [\varphi_i]^T & 0 \\ 0 & 0 & [\varphi_i]^T \end{bmatrix}$$

where $\hat{e}_j$ represent the standard basis vectors.

In both cases, maximum representation error, $\epsilon$, is $$\varepsilon = \min_{a \in \mathbb{R}^m} \max_{(q,\dot{q},c) \in \Xi} \|\varphi(q, \dot{q}; \Theta)a - f(q, \dot{q}; c)\| \quad (4)$$

where $\Xi$ is the compact domain of interest. Note, the boundedness of $\epsilon$ is apparent under the assumption of bounded Lipschitz constant of $f(q,\dot{q},c)$ and bounded training error. Given $\Theta$, the goal then can be to design a control law, $\tau(q,\dot{q},q_d,\dot{q}_d)$, that drives $(q,\dot{q}) \to (q_d,\dot{q}_d)$, subject to dynamics in (1).

Quadrotor Position Control Subject to Uncertain Conditions

Given quadrotor states as global position $p \in \mathbb{R}^3$, velocity $v \in \mathbb{R}^3$, attitude rotation matrix $R \in SO(3)$, and body angular velocity $\omega \in \mathbb{R}^3$, consider the following dynamics:

$$\dot{p}=v, \; m\dot{v}=mg+Rf_u+f_a, \quad (5a)$$

$$\dot{R}=RS(\omega), \; J\dot{\omega}=J\omega \times \omega+\tau_u+\tau_a, \quad (5b)$$

where m and J are mass and inertia matrix of the system respectively, $S(\cdot)$ is skew-symmetric mapping, $g=[0,0,-g]^T$ is the gravity vector, $f_u=[0,0,T]^T$ and $\tau_u=[\tau_x, \tau_y, \tau_z]^T$ are the total thrust and body torques from four rotors predicted by a nominal model. $\eta=[T, \tau_x, \tau_y, \tau_z]^T$ denotes the output wrench. Typical quadrotor control input uses squared motor speeds $u=[n_1^2, n_2^2, n_3^2, n_4^2]^T$, and is linearly related to the output wrench $\eta=B_0 u$, with $$B_0 = \begin{bmatrix} c_T & c_T & c_T & c_T \\ 0 & c_T l_{arm} & 0 & -c_T l_{arm} \\ -c_T l_{arm} & 0 & c_T l_{arm} & 0 \\ -c_Q & c_Q & -c_Q & c_Q \end{bmatrix}, \quad (6)$$

where $C_T$ and $C_Q$ are rotor force and torque coefficients, and $l_{arm}$ denotes the length of rotor arm. A key difficulty of precise landing can be the influence of unknown disturbance forces $f_a=[f_{a,x}, f_{a,y}, f_{a,z}]^T$ and torques $\tau_a=[\tau_{a,x}, \tau_{a,y}, \tau_{a,z}]^T$, which originate from complex aerodynamic interactions between the quadrotor and the environment, such as those due to ground effects and/or varying wind conditions.

Systems and methods in accordance with certain embodiments of the invention can improve controller accuracy by learning the unknown disturbance forces $f_a$ and/or torques $\tau_a$. In a number of situations (such as, but not limited to, landing, take-off, and flying in strong wind conditions), the attitude dynamics is limited and the aerodynamic disturbance torque $\tau_a$ can be bounded. Position dynamics eq. (5a) and $f_a$ can be the primary concern. Considering only position dynamics, eq. (5a) can be cast into the form of (1), by taking $H(q)=mI$, where I is the identity matrix, $C(q,\dot{q})=0$, $g=mg$, $f(q,\dot{q};c)=f_a$ and $\tau=Rf_u$. Note that the quadrotor attitude dynamics is just a special case of (1). In various embodiments, $f_a$ can be approximated using a DNN with spectral normalization to guarantee its Lipschitz constant, and then the DNN can be incorporated in the exponentially-stabilizing controller. In numerous embodiments, training can be done off-line and the learned dynamics can be applied in the on-board controller in real-time to achieve smooth flight paths in varied conditions.

Meta-Learning and Adaptation Goal

Suppose there is a pre-collected meta-training data $D_{meta}=\{D_1, D_2, \ldots, D_T\}$, with T sub datasets. In each sub dataset, $D_i$, there are $L_i$ state and force measurement pairs, $([q_k,\dot{q}_k], \hat{f}(q_k,\dot{q}_k,c_i))$, generated from some fixed but unknown wind condition, represented by $c_i$. The goal of meta-learning is to generate a set of parameters, $\Theta=\{\theta_i\}_{i=1}^m$, such that a linear combination of the neural net kernels, $\{\varphi_i\}_{i=1}^m$, can represent any wind condition with small error.

Consequently, the adaptive controller aims to stabilize the system to a desired trajectory given the prior information of the dynamic model (1) and the learned kernels, (2) or (3). If exponential convergence is guaranteed, then the system is robust to aerodynamic effects not represented by the prior from meta learning, which is encapsulated in $\epsilon$.

In a variety of embodiments, rather than training on multiple sub datasets for different wind conditions, training can be performed on a single data set, D, with variable wind conditions, c. The goal would be to learn a set of kernel functions that represents the state and small time scale dependence of the aerodynamic forces on the wind conditions. Then, the last layer parameters, a, can be slowly adapted as the wind conditions evolve. The key difference in training these kernels would be in solving for $a(\Theta)$. Now, instead of sampling the data set and solving $a(\Theta)$ through least squares, a will be solved using least squares with exponential forgetting, similar to the adaptive control, such that $a(t, \Theta)$.

Meta-Learning Neural Net Kernels

Learning Residual Dynamics

In various embodiments, unknown disturbance forces $f_a$ can be learned using a DNN with Rectified Linear Units (ReLU) activation. In general, DNNs equipped with ReLU converge faster during training, demonstrate more robust behavior with respect to changes in hyperparameters, and have fewer vanishing gradient problems compared to other activation functions such as sigmoid.

ReLU Deep Neural Networks

A ReLU deep neural network represents the functional mapping from the input x to the output $f(x,\theta)$, parameterized by the DNN weights $\theta = W^1, \ldots, W^{L+1}$:

$$f(x, \theta) = W^{L+1}\phi(W^L(\phi(W^{L-1}(\ldots \phi(W^1 x)\ldots)))), \quad (7)$$

where the activation function $\phi(\cdot) = \max(\cdot, 0)$ is called the element-wise ReLU function. ReLU is less computationally expensive than tanh and sigmoid because it involves simpler mathematical operations. However, deep neural networks are usually trained by first-order gradient based optimization, which is highly sensitive on the curvature of the training objective and can be unstable. To alleviate this issue, processes in accordance with some embodiments of the invention can apply the spectral normalization technique.

Spectral Normalization

Spectral normalization can stabilize DNN training by constraining the Lipschitz constant of the objective function. Spectrally normalized DNNs have also been shown to generalize well, which is an indication of stability in machine learning. Mathematically, the Lipschitz constant of a function $\|f\|_{Lip}$ is defined as the smallest value such that $$\forall x, x': \|f(x) - f(x')\|_2 / \|x - x'\|_2 \leq \|f\|_{Lip}.$$

It is known that the Lipschitz constant of a general differentiable function f is the maximum spectral norm (maximum singular value) of its gradient over its domain $\|f\|_{Lip} = \sup_x \sigma(\nabla f(x))$.

The ReLU DNN in eq. (7) is a composition of functions (or layers). In several embodiments, the Lipschitz constant of a network can be bounded by constraining the spectral norm of each layer $g^l(x) = \phi(W^l x)$. Therefore, for a linear map $g(x) = Wx$, the spectral norm of each layer is given by $\|g\|_{Lip} = \sup_x \sigma(\nabla g(x)) = \sup_x \sigma(W) = \sigma(W)$. Using the fact that the Lipschitz norm of the ReLU activation function $\phi(\cdot)$ is equal to 1, with the inequality $\|g_1 \circ g_2\|_{Lip} \leq \|g_1\|_{Lip} \cdot \|g_2\|_{Lip}$, the following bound can be found on $\|f\|_{Lip}$:

$$\|f\|_{Lip} \leq \|g^{L+1}\|_{Lip} \cdot \|\phi\|_{Lip} \ldots \|g^1\|_{Lip} = \prod_{l=1}^{L+1} \sigma(W^l). \quad (8)$$

In certain embodiments, spectral normalization can be applied to the weight matrices in each layer during training as follows:

$$\overline{W} = W/\sigma(W) \cdot \gamma^{\frac{1}{L+1}}, \quad (9)$$

where $\gamma$ is the intended Lipschitz constant for the DNN. The following lemma can bound the Lipschitz constant of a ReLU DNN with spectral normalization.

Lemma 1. For a multi-layer ReLU network $f(x, \theta)$, defined in eq. (7) without an activation function on the output layer. Using spectral normalization, the Lipschitz constant of the entire network satisfies:

$$\|f(x, \overline{\theta})\|_{Lip} \leq \gamma,$$

with spectrally-normalized parameters $\overline{\theta} = \overline{W}^1, \ldots, \overline{W}^{L+1}$.

Proof. As in eq. (8), the Lipschitz constant can be written as a composition of spectral norms over all layers. The proof follows from the spectral norms constrained as in eq. (9).

Constrained Training

Gradient-based optimization in accordance with several embodiments of the invention can be applied to train the ReLU DNN with a bounded Lipschitz constant, In certain embodiments, estimating $f_a$ in (5) boils down to optimizing the parameters $\theta$ in the ReLU network in eq. (7), given the observed value of x and the target output. In particular, the Lipschitz constant of the ReLU network can be controlled.

The optimization objective in accordance with a variety of embodiments of the invention is as follows, where the prediction error can be minimized with a constrained Lipschitz constant:

$$\underset{\theta}{\text{minimize}} \sum_{t=1}^{T} \frac{1}{T} \|y_t - f(x_t, \theta)\|_2 \quad (10)$$

$$\text{subject to } \|f\|_{Lip} \leq \gamma.$$

where $y_t$ is the observed disturbance forces and $X_t$ is the observed states and control inputs. According to the upper bound in eq. (8), the constraint in accordance with a number of embodiments of the invention can be substituted by minimizing the spectral norm of the weights in each layer. In many embodiments, stochastic gradient descent (SGD) can be used to optimize eq. (10) and apply spectral normalization to regulate the weights. From Lemma 1, the trained ReLU DNN has a Lipschitz constant.

Learning Kernel Functions

Recall that the meta learning goal is to learn a set of kernel functions, $\{\varphi(q,\dot{q})\}$, such that for any wind condition, c, there exists a suitable a such that $\varphi(q,\dot{q},\Theta)$ is a good approximation of $f(q,\dot{q},c)$. This problem can be formulated as the minimization problem $$\Theta^* = \min_{a_i, \Theta} \sum_i J_i(a_i, \Theta) \text{ with} \quad (11)$$

$$J_i(a_i, \Theta, (q_i(\cdot), \dot{q}_i(\cdot))) = \int_0^{t_f} \|f(q_i(r), \dot{q}_i(r), c_i) - \varphi(q_i(r), \dot{q}_i(r), \Theta) a_i\|^2 dr \approx J(a_i, \Theta, D_i) = \Delta t \cdot \sum_{(q,\dot{q},f) \in D_i} \|f - \varphi(q, \dot{q}, \Theta) a_i\|$$

where the training data is divided into subsets, $D_i$, each corresponding to a fixed wind condition.

Note that (11) can be equivalently written as $$\min_\Theta \sum_i \min_{a_i} J_i(a_i, \Theta) \quad (12)$$

The inner problem, $\Sigma_i \min_{a_i} J_i(a_i, \Theta)$, is simply a linear least squares problem and can be solved exactly for a fixed value of $\Theta$. In a number of embodiments, since there are many more training examples, given as discrete measurements of $(q,\dot{q},f(q,\dot{q},c)$, than parameters, a, the least squares solution is over determined and can be approximated with the least squares solution on a small, randomly sampled subset of the training examples, $D_i^a$. The remaining examples $D_i^\Theta$, such that $D_i^a \cup D_i^\Theta = D_i$ and $D_i^a \cap D_i^\Theta = 0$.

Write the least squares solution for a as $$a = a_{LS}(\Theta, D_i^a). \quad (13)$$

Note that this solution can be explicitly written as the solution to the following equation.

$$\underbrace{\begin{bmatrix} \varphi(q^{(1)}, \dot{q}^{(1)}, \theta) \\ \varphi(q^{(2)}, \dot{q}^{(2)}, \theta) \\ \vdots \\ \varphi(q^{(K)}, \dot{q}^{(K)}, \theta) \end{bmatrix}}_{\Phi \in \mathbb{R}^{K \times m}} a = \underbrace{\begin{bmatrix} f^{(1)} \\ f^{(2)} \\ \vdots \\ f^{(K)} \end{bmatrix}}_{F}. \quad (14)$$

where K is the size of $D_i^a$. Therefore the least-square solution will be $$a_{LS}(\Theta, D_i^a) = LS(\Theta, D_i^a) = (\Phi^T \Phi)^{-1} \Phi^T F \quad (15)$$

Now with a as a function of $\Theta$, the outer problem in (12) can be solved using stochastic gradient descent on $\Theta$ in accordance with certain embodiments of the invention. An example of a meta-learning procedure is illustrated in FIG. 4.

Controller Design

Adaptive controllers for 3-D trajectory tracking in accordance with various embodiments of the invention can be constructed as a nonlinear feedback linearization controller whose stability guarantees are obtained using the spectral normalization of the DNN-based ground-effect model. In some embodiments, the Lipschitz property of a DNN can be exploited to solve for the resulting control input using fixed-point iteration.

Reference Trajectory Tracking

The position tracking error can be defined as $\tilde{p} = p - p_d$. Controllers in accordance with numerous embodiments of the invention can use a composite variable $s=0$ as a manifold on which $\tilde{p}(t) \to 0$ exponentially:

$$s = \dot{\tilde{p}} + \Lambda \tilde{p} = \dot{p} - v_r \quad (16)$$

with $\Lambda$ as a positive definite or diagonal matrix. Now the trajectory tracking problem can be transformed to tracking a reference velocity $v_r = \dot{p}_d - \Lambda \tilde{p}$.

Define $\hat{f}_a(\zeta, u)$ as the DNN approximation to the disturbance aerodynamic forces, with $\zeta$ being the partial states used as input features to the network. The total desired rotor force $f_d$ can be designed as $$f_d = (Rf_u)_d = \bar{f}_d - \hat{f}_a, \text{ with } \bar{f}_d = m\dot{v}_r - K_v s - mg. \quad (17)$$

Substituting eq. (17) into eq. (5), the closed-loop dynamics would simply become $m\dot{s} + K_v s = \epsilon$, with approximation error $\epsilon = f_a - \hat{f}_a$. Hence, $\tilde{p}(t) \to 0$ globally and exponentially with bounded error, as long as $\|\epsilon\|$ is bounded.

Consequently, desired total thrust $T_d$ and desired force direction $\hat{k}_d$ can be computed as $$T_d = f_d \hat{k}, \text{ and } \hat{k}_d = f_d / \|f_d\|, \quad (18)$$

with $\hat{k}$ being the unit vector of rotor thrust direction (typically z-axis in quadrotors). Using $\hat{k}_d$ and fixing a desired yaw angle, desired attitude $R_d$ can be deduced. Assume that a nonlinear attitude controller uses the desired torque $\tau_d$ from rotors to track $R_d(t)$, such as by:

$$\tau_d = J\dot{\omega}_r - J\omega \times \omega_r - K_\omega (\omega - \omega_r), \quad (19)$$

where the reference angular rate $\omega_r$ is designed similar to eq. (16), so that when $\omega \to \omega_r$, exponential trajectory tracking of a desired attitude $R_d(t)$ is guaranteed within some bounded error in the presence of bounded disturbance torques.

Learning-Based Discrete-Time Nonlinear Controller

From eqs. (6), (18) and (19), the desired wrench $\eta_d = [T_d, \tau_d^T]^T$ can be related with the control signal u through $$B_0 u = \eta_d = \begin{bmatrix} (\bar{f}_d - \hat{f}_a(\zeta, u)) \cdot \hat{k} \\ \tau_d \end{bmatrix}. \quad (20)$$

Because of the dependency of $\hat{f}_a$ on u, the control synthesis problem here is non-affine. Therefore, in many embodiments, the following fixed-point iteration method can be used for solving eq. (20):

$$u_k = B_0^{-1} \eta_d(u_{k-1}), \quad (21)$$

where $u_k$ and $u_{k-1}$ are the control input for current and previous time-step in the discrete-time controller. Next, the stability of the system and convergence of the control inputs are proved in eq. (21).

Robust Composite Adaptation

Recall the control design objective is to design a control system that leverages the kernels, $\varphi(q,\dot{q};\Theta)$, to stabilize the system defined in (1), to some desired trajectory $(q_d, \dot{q}_d)$. Treating $\Theta$ as fixed, dependence on $\Theta$ will not be notated in this section. The control system will have two parts: a control law, $\tau(q,\dot{q},q_d,\dot{q}_d,\hat{a})$, and an update law, $\hat{a}(q,\dot{q},q_d,\dot{q}_d,\tau)$.

In the process of designing the control system, a few key assumptions can be made.

Assumption 1. The desired trajectory and its first and second derivatives, $\{q_d(t), \dot{q}_d(t), \ddot{q}_d(t)\}$, are bounded.

Assumption 2. The flown flight trajectory, $(q(t), \dot{q}(t))$, and the current wind conditions, c, are a subset of $\Xi$. Thus, the optimal parameters for the flown flight trajectory and current wind conditions, given by $a = a_{LS}(\Theta,(q(t),\dot{q}(t),f(q(t),\dot{q}(t),c))$, with pointwise representation error, $d(q,\dot{q}) = \|\varphi(q,\dot{q};\Theta)a - f(q,\dot{q};c)\|$, have maximum representation error along the flown flight trajectory, d, less than the maximum global representation error, $\epsilon$. That is, $$d(q, \dot{q}) \triangleq \|\varphi(q, \dot{q}; \Theta)a - f(q, \dot{q}; c)\| d \quad (22)$$

$$d \triangleq \min_{a \in \mathbb{R}^m} \max_t \|\varphi(q(t), \dot{q}(t))a - f(q(t), \dot{q}(t), c)\| \leq \varepsilon \quad (23)$$

Note that for time varying optimal parameters, $a=a(t)$, the same formulation can be followed, but with an additional disturbance term proportional to $\dot{a}$.

Nonlinear Control Law

In formulating the control problem, the composite velocity tracking error term, s, and the reference velocity, $\dot{q}_r$, can be defined such that $s=\dot{q}-\dot{q}_r=\dot{\tilde{q}}+\Lambda\tilde{q}$, where $\tilde{q}=q-q_d$ is the position tracking error, and $\Lambda$ is a control gain and positive definite. Then given parameter estimate â, the following control law can be defined $$\tau=H(q)\ddot{q}_r+C(q,\dot{q})\dot{q}_r+g(q)+\varphi(q,\dot{q})\hat{a}-Ks \quad (24)$$

where K is another positive definite control gain. Combining (1) and (24) leads to the closed-loop dynamics of $$H(q)\dot{s}+(C(q,\dot{q})+K)s-\varphi(q,\dot{q})\tilde{a}=d(q,\dot{q}) \quad (25)$$

Composite Adaptation Law

Systems and methods in accordance with certain embodiments of the invention can define an adaptation law that combines a tracking error update term, a prediction error update term, and a regularization term. First, the prediction error can be defined as $$e(q,\dot{q})\triangleq\varphi(q,\dot{q})\hat{a}-f(q,\dot{q},c)=\varphi(q,\dot{q})\tilde{a}+d(q,\dot{q}) \quad (26)$$

Next, the right hand side of (26) can be filtered with a stable first-order filter with step response w(r) to define the filtered prediction error.

$$e_1(\hat{a},t)\triangleq W(t)\hat{a}-y_1(t)=W(t)\tilde{a}+d_1(t) \quad (27)$$

with filtered measurement, $y_1=y_1(t)=\int_0^t w(t-r)y(r)dr$, filtered kernel function, $W=W(t)=\int_0^t w(t-r)\varphi(r)dr$, and filtered disturbance, $d_1=d_1(t)=\int_0^t w(t-r)d(r)dr$.

Now consider the following cost function in accordance with certain embodiments of the invention.

$$J_2(\hat{a})=\int_0^t e^{-\lambda(t-r)}\|W(r)\hat{a}-y_1(r)\|^2 dr+\gamma\|\hat{a}\|^2 \quad (28)$$

Note this is is closely related to the cost function defined in (11), with three modifications. First, the inclusion of an exponential forgetting factor will lead to exponential convergence of $\sqrt{\bar{P}^{-1}}\tilde{a}$, where $\bar{P}$ will be defined in (31). Second, the regularization term, $\gamma\|\hat{a}\|^2$ will guarantee invertibility of $\bar{P}$, even without the persistence of an excitation condition usually required to guarantee parameter convergence. However, note that lack of persistence of excitation could lead to poorly conditioned $\bar{P}^{-1}$. Regularization also introduces an additional disturbance term proportional to a, as seen later in (34). Third, cost functions in accordance with various embodiments of the invention can use a filtered prediction error instead of an unfiltered prediction error to smooth the update law and to allow the removal of $\ddot{q}$ from the update law via integration by parts on $y_1$.

Note that $J_2$ is quadratic and convex in â, leading to a simple closed form solution for â. However, this requires evaluating an integral over the entire trajectory at every time step, so differentiating this closed form solution for â gives the following prediction error with regularization regularization update law.

$$\dot{\hat{a}}=-\bar{P}(W^T e_1+\lambda\gamma\hat{a}) \quad (29)$$

$$\dot{\bar{P}}(\lambda-\lambda\gamma\bar{P}-\bar{P}W^T W)\bar{P} \quad (30)$$

where $$\bar{P}\triangleq(\int_0^t e^{-\lambda(t-r)}W^T W\, dr+\gamma)^{-1} \quad (31)$$

Processes in accordance with various embodiments of the invention can define the composite adaptation law with regularization, which incorporates an additional tracking error based term proportional to s into (29). As described below, tracking error terms in accordance with many embodiments of the invention can exactly cancel the ã term in (25).

$$\dot{\hat{a}}=-\bar{P}(\varphi^T s+W^T e_1+\lambda\gamma\hat{a}) \quad (32)$$

Theorem 2. Under Assumptions 1 and 2 and using the control law defined in (24), the composite tracking error and parameter estimation error evolving according to the dynamics in (25) and adaptation law in (30-32) exponentially converge to the error ball $$\left\|\begin{bmatrix} s \\ \tilde{a} \end{bmatrix}\right\| \leq \frac{\sup_t[\kappa(H(q(t))), \kappa(\bar{P}^{-1})]}{\min\left[k, \frac{\lambda}{2}(\lambda_{min}(\bar{P}^{-1})+\gamma)\right]} \sup\left\|\begin{bmatrix} d \\ W^T d_1+\lambda\gamma a \end{bmatrix}\right\| \quad (33)$$

where $k=\lambda_{min}K$ and $\kappa(\cdot)$ is the condition number.

Proof. Rearranging the composite tracking error dynamics and the parameter estimate dynamics, defined in (25) and (32), and using the derivative of $\bar{P}^{-1}$ given in (30), the combined closed loop dynamics becomes $$\begin{bmatrix} H(q) & 0 \\ 0 & \bar{P}^{-1} \end{bmatrix}\begin{bmatrix} \dot{s} \\ \dot{\tilde{a}} \end{bmatrix}+\begin{bmatrix} C(q,\dot{q})+K & -\varphi(q,\dot{q}) \\ \varphi(q,\dot{q})^T & W^T W+\lambda\gamma I \end{bmatrix}\begin{bmatrix} s \\ \tilde{a} \end{bmatrix}=\begin{bmatrix} d(q,\dot{q}) \\ -(W^T d_1+\lambda\gamma a) \end{bmatrix} \quad (34)$$

Consider the Lyapunov-like function $V=y^T My$, with $$y=\begin{bmatrix} s^T & \tilde{a}^T \end{bmatrix}^T$$

and metric function, M, given by $$M=\begin{bmatrix} H(q) & 0 \\ 0 & \bar{P}^{-1} \end{bmatrix} \quad (35)$$

Using the closed loop dynamics given in (34) and the skew symmetric property of $\dot{M}-2C$, the inequality relationship for the derivative of V is $$\frac{d}{dt}(y^T My)=2y^T M\dot{y}+y^T \dot{M}y \quad (36)$$

$$=-y^T\begin{bmatrix} 2K & 0 \\ 0 & \lambda\bar{P}^{-1}+\lambda\gamma I+W^T W \end{bmatrix}y+y^T\begin{bmatrix} d \\ -(W^T d_1+\lambda\gamma a) \end{bmatrix} \quad (37)$$

$$\leq -2\lambda_{con}V+d\sqrt{V} \quad (38)$$

where $$\lambda_{con}=\frac{\min\left[k, \frac{\lambda}{2}(\lambda_{min}(\bar{P}^{-1})+\gamma)\right]}{\lambda_{max}(M)} \quad (39)$$

and $$d=\sqrt{1/\lambda_{min}(M)}\left\|\begin{bmatrix} d \\ W^T d_1+\lambda\gamma a \end{bmatrix}\right\| \quad (40)$$

Applying the transformation $W=\sqrt{y^T My}$ and a comparison lemma results in $$\|y\| \le \sqrt{\kappa(M)} \|y(0)\| e^{-\lambda_{cont}t} + \frac{\bar{d}}{\lambda_{con}\sqrt{\lambda_{min}M}}(1 - e^{-\lambda_{con}t}) \quad (41)$$

thus proving the exponential convergence to the error ball given in (33).

Neural Lander Stability Proof

The closed-loop tracking error analysis provides a direct correlation on how to tune the neural network and controller parameter to improve control performance and robustness.

Control Allocation as Contraction Mapping

The control input $u_k$ converges to the solution of eq. (20) when all states are fixed, as shown below.

Lemma 3. Define mapping $u_k = \mathcal{F}(u_{k-1})$ based on eq. (21) and fix all current states:

$$\mathcal{F}(u) = B_0^{-1}\begin{bmatrix} (\bar{f}_d - \hat{f}_a(\zeta, u)) \cdot \hat{k} \\ \tau_d \end{bmatrix} \quad (42)$$

If $\hat{f}_a(\zeta,u)$ is $L_a$-Lipschitz continuous, and $\sigma(B_0^{-1}) \cdot L_a < 1$; then $\mathcal{F}(\cdot)$ is a contraction mapping, and $u_k$ converges to unique solution of $u^* = \mathcal{F}(u^*)$.

Proof. $\forall u_1, u_2 \in \mathcal{U}$ with $\mathcal{U}$ being a compact set of feasible control inputs; and given fixed states as $\bar{f}_d$, $\tau_d$ and $\hat{k}$, then:

$$\|\mathcal{F}(u_1) - \mathcal{F}(u_2)\|_2 = \|B_0^{-1}(\hat{f}_a(\zeta,u_1) - \hat{f}_a(\zeta,u_2))\|_2 \le \sigma(B_0^{-1}) \cdot L_a \|u_1 - u_2\|_2.$$

Thus, $\exists a<1, s.t \|\mathcal{F}(u_1) - \mathcal{F}(u_2)\|_2 \le a\|u_1 - u_2\|_2$. Hence, $\mathcal{F}(\cdot)$ is a contraction mapping.

The fixed iteration is a zero'th order method, since it does not rely on any derivatives to solve the equation. In several embodiments, higher order methods can be used (with some computational trade offs) to solve non-affine control problems, which may not meet the convergence criteria for the fixed point iteration.

Stability of Learning-Based Nonlinear Controller

Before continuing to prove the stability of the full system, make the following assumptions.

Assumption 3. The desired states along the position trajectory $p_d(t)$, $\dot{p}_d(t)$, and $\ddot{p}_d(t)$ are bounded.

Assumption 4. One-step difference of control signal satisfies $\|u_k - u_{k-1}\| \le \rho\|s\|$ with a small positive $\rho$.

For the intuition behind this assumption, from eq. (42), the following approximate relation can be derived with $\Delta(\cdot)_k = \|(\cdot)_k - (\cdot)_{k-1}\|$:

$$\Delta u_k \le \sigma(B_0^{-1})(L_a \Delta u_{k-1} + L_a \Delta \zeta_k + m \Delta \dot{v}_{r,k} + \lambda_{max}(K_v) \Delta s_k + \Delta \tau_{d,k}).$$

Because the update rate of attitude controller (>100 Hz) and motor speed control (>5 kHz) are much higher than that of the position controller ($\approx$10 Hz), in practice, $\Delta s_k$, $\Delta \dot{v}_{r,k}$, and $\Delta \zeta_k$ can be safely neglected in one update. Furthermore, $\Delta \tau_{d,k}$ can be limited internally by the attitude controller. It leads to:

$$\Delta u_k \le \sigma(B_0^{-1})(L_a \Delta u_{k-1} + c),$$

with c being a small constant and $\sigma(B_0^{-1}) \cdot L_a < 1$ from Lemma. 3, it can be deduced that $\Delta u$ rapidly converges to a small ultimate bound between each position controller update.

Assumption 5. The learning error of $\hat{f}_a(\zeta, u)$ over the compact sets $\zeta \in Z$, $u \in \mathcal{U}$ is upper bounded by $\epsilon_m = \sup_{\zeta \in Z, u \in \mathcal{U}} \|\epsilon(\zeta, u)\|$, where $\epsilon(\zeta, u) = f_a(\zeta, u) - \hat{f}_a(\zeta, u)$.

DNNs have been shown to generalize well to the set of unseen events that are from almost the same distribution as the training set. This empirical observation is also theoretically studied in order to shed more light toward an understanding of the complexity of these models. Based on the above assumptions, the overall stability and robustness results are presented below.

Theorem 4. Under Assumptions 1-3, for a time-varying $p_d(t)$, the controller defined in eqs. (17) and (21) with $\lambda_{min}(K_v) > L_a \rho$ achieves exponential convergence of composite variable s to error ball $\lim_{t \to \infty} \|s(t)\| = \epsilon_m/(\lambda_{min}(K_v) - L_a \rho)$ with rate $((\lambda_{min}(K_v) - L_a \rho)/m$. And $\tilde{p}$ exponentially converges to error ball $$\lim_{t \to \infty} \|\tilde{p}(t)\| = \frac{\epsilon_m}{\lambda_{min}(\Lambda)(\lambda_{min}(K_v) - L_a \rho)} \quad (43)$$

with rate $\lambda_{min}(\Lambda)$.

Proof. Select a Lyapunov function as $V(s) = \frac{1}{2}m\|s\|^2$, then apply the controller eq. (17) to get the time-derivative of V:

$$\dot{V} = s^T(-K_v s + \hat{f}_a(\zeta_k, u_k) - f_a(\zeta_k, u_{k-1}) + \epsilon(\zeta_k, u_k)) \le -s^T K_v s + \|s\|(\|\hat{f}_a(\zeta_k, u_k) - f_a(\zeta_k, u_{k-1})\| + \epsilon_m)$$

Let $\lambda = \lambda_{min}(K_v)$ denote the minimum eigenvalue of the positive-definite matrix $K_v$. By applying the Lipschitz property of $\hat{f}_a$ lemma 1 and Assumption 2, obtain $$\dot{V} \le -\frac{2(\lambda - L_a\rho)}{m}V + \sqrt{\frac{2V}{m}}\epsilon_m$$

Using the Comparison Lemma, define $W(t) = \sqrt{V(t)} = \sqrt{m/2}\|s\|$ and $\dot{W} = \dot{V}/(2\sqrt{V})$ to obtain $$\|s(t)\| \le \|s(t_0)\|\exp\left(-\frac{\lambda - L_a\rho}{m}(t - t_0)\right) + \frac{\epsilon_m}{\lambda - L_a\rho}$$

It can be shown that this leads to finite-gain $\mathcal{L}_p$ stability and input-to-state stability (ISS). Furthermore, the hierarchical combination between s and $\tilde{p}$ in eq. (16) results in $\lim_{t \to \infty} \|\tilde{p}(t)\| = \lim_{t \to \infty} \|s(t)\|/\lambda_{min}(\Lambda)$, yielding (43).

EXPERIMENTAL VALIDATION

A learning-based composite-adaptation controller in accordance with many embodiments of the invention was implemented and tested on an INTEL Aero Ready to Fly Drone. It was tested with three different trajectories for each of three different kernel functions. In each test, wind conditions were generated using CAST's open air wind tunnel. The first test had the drone hover in increasing wind speeds. The second test had the drone move quickly between different set points with increasing wind speeds. These time varying wind conditions showed the ability of the controller to adapt to new conditions in real time. The third test had the drone fly in a FIG. 8 pattern in constant wind to demonstrate performance over a dynamic trajectory. The prediction error (mean($\|e_1\|$)), composite velocity tracking error (mean($\|s\|$)), and position tracking error (mean($\|q - q_d\|$)) for each kernel function and each trajectory is listed in FIG. 5.

The INTEL Aero Drone incorporates a PX4 flight controller with the INTEL Aero Compute Board, which runs Linux on a 2.56 GHz Intel Atom x7 processor with 4 GB RAM. The controller was implemented on the Linux board and sent thrust and attitude commands to the PX4 flight controller using MAVROS software. CAST's Optitrack motion capture system was used for global position information, which was broadcast to the drone via WIFI. An Extended Kalman Filter (EKF) running on the PX4 controller filtered the IMU and motion capture information, to produce position and velocity estimates. The CAST open air wind tunnel consists of approximately 1,400 distributed fans, each individually controllable, in a 3 by 3 meter grid.

Data Collection and Kernel Training

Figure 6:
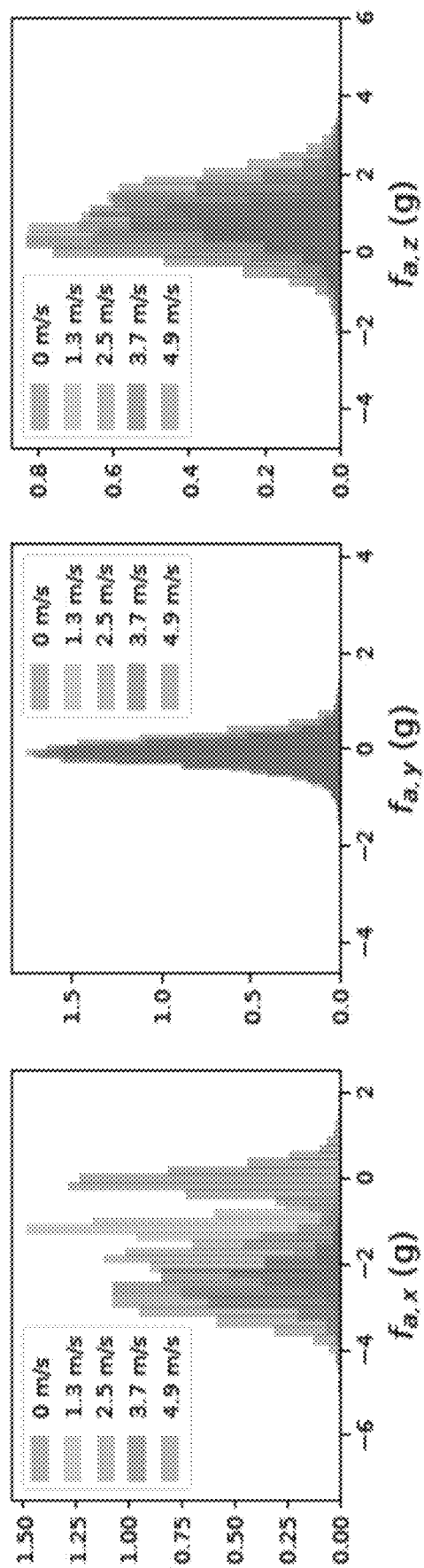
FIG. 6 illustrates examples of distributions of the gathered data at different wind speeds.

Position, velocity, acceleration, and motor speed data was gathered by flying the drone on a random walk trajectory for at 0, 1.3, 2.5, 3.7, and 4.9 m/s wind speeds for 2 minutes each, to generate training data. The trajectory was generated by randomly moving to different set points in a predefined cube centered in front of the wind tunnel. Then, using the dynamics equations defined previously, the aerodynamic disturbance force, f, was computed. FIG. 6 illustrates examples of distributions of the gathered data at different wind speeds. The charts in this example show that there are significant shifts in $f_{a,x}$ and $f_{a,z}$ under different wind speeds.

Three different kernel functions were used in the tests. The first was an identity kernel, $\varphi=I$. Note that with only a tracking error update term in the adaptation law, this would be equivalent to integral control. The second and third kernels were the vector and scalar kernels, defined in (2) and (3), respectively.

Figure 7:
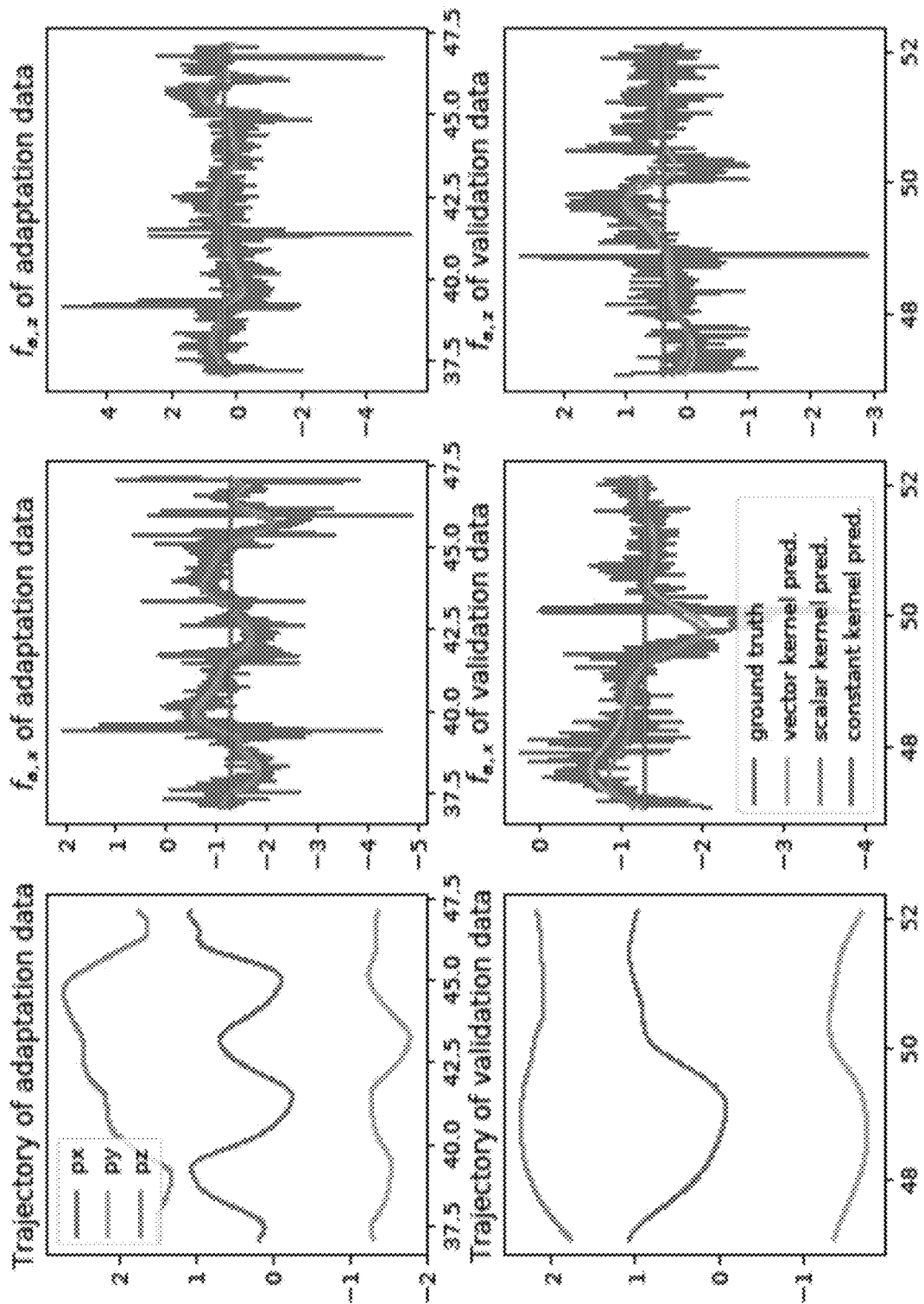
FIG. 7 illustrates plots of the validation process for different kernel methods in accordance with an embodiment of the invention.

During offline training, the kernels were validated by estimating a using a least squares estimator on a continuous segment of a validation trajectory. Then, the predicted force was compared to the measured force for another part of the validation trajectory. FIG. 7 illustrates plots of the validation process for different kernel methods. These three plots show the validation process for each of the three kernel methods discussed in the Experiments section. The first row shows the least squares fit of the parameters a for each kernel choice. The second row shows the prediction performance for a taken from the least squares estimator in the first row.

Hovering in Increasing Wind

Figure 8:
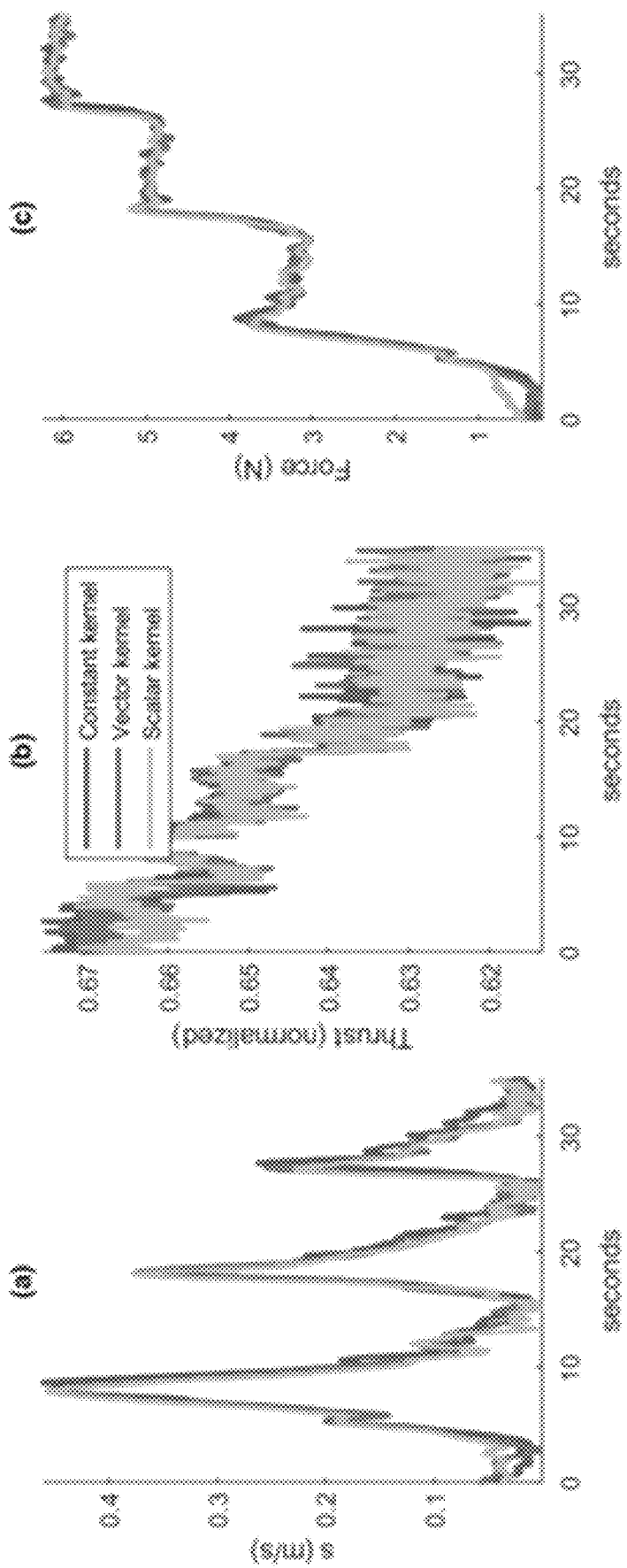
FIG. 8 illustrates plots of the results from hovering in variable wind conditions.

In this test, the drone was set to hover at a fixed height centered in the wind tunnel test section. The wind tunnel was set to 2.5 m/s for 15 seconds, then 4.3 m/s for second 10 seconds, then 6.2 m/s for 10 seconds. FIG. 8 illustrates plots of the results from hovering in variable wind conditions. The increase in wind speed can be clearly seen at 0, 15, and 25 seconds in each plot. Plot (a) shows each choice of kernel function leads to similar composite velocity tracking error convergence. Plot (b) shows that the drone gained efficiency and required a lower throttle to maintain hover as wind speed increased. Plot (c) shows the increase in the magnitude of the measured aerodynamic force as the wind speed increased.

In this test, each controller achieves similar parameter convergence. The facts that for each case, as the drone converges to the target hover position, the kernel functions approach a constant value, and each uses the same adaptation law, probably leads to similar convergence properties for each controller. Note however, as seen in FIG. 5, that the prediction error is lower for the learned kernels, as the learned kernels likely capture some of the variation in aerodynamic forces with the change in state.

Random Walk with Increasing Wind

The second test had the drone move quickly between random set points in a cube centered in front of the wind tunnel, with a new set point generated every second for 60 seconds. For the first 20 seconds, the wind tunnel was set to 2.5 m/s, for the second 20 seconds, 4.3 m/s, and for the last 20 seconds, 6.2 m/s. The random number generator seed was fixed before each test so that each controller received the exact same set points.

Figure 9:
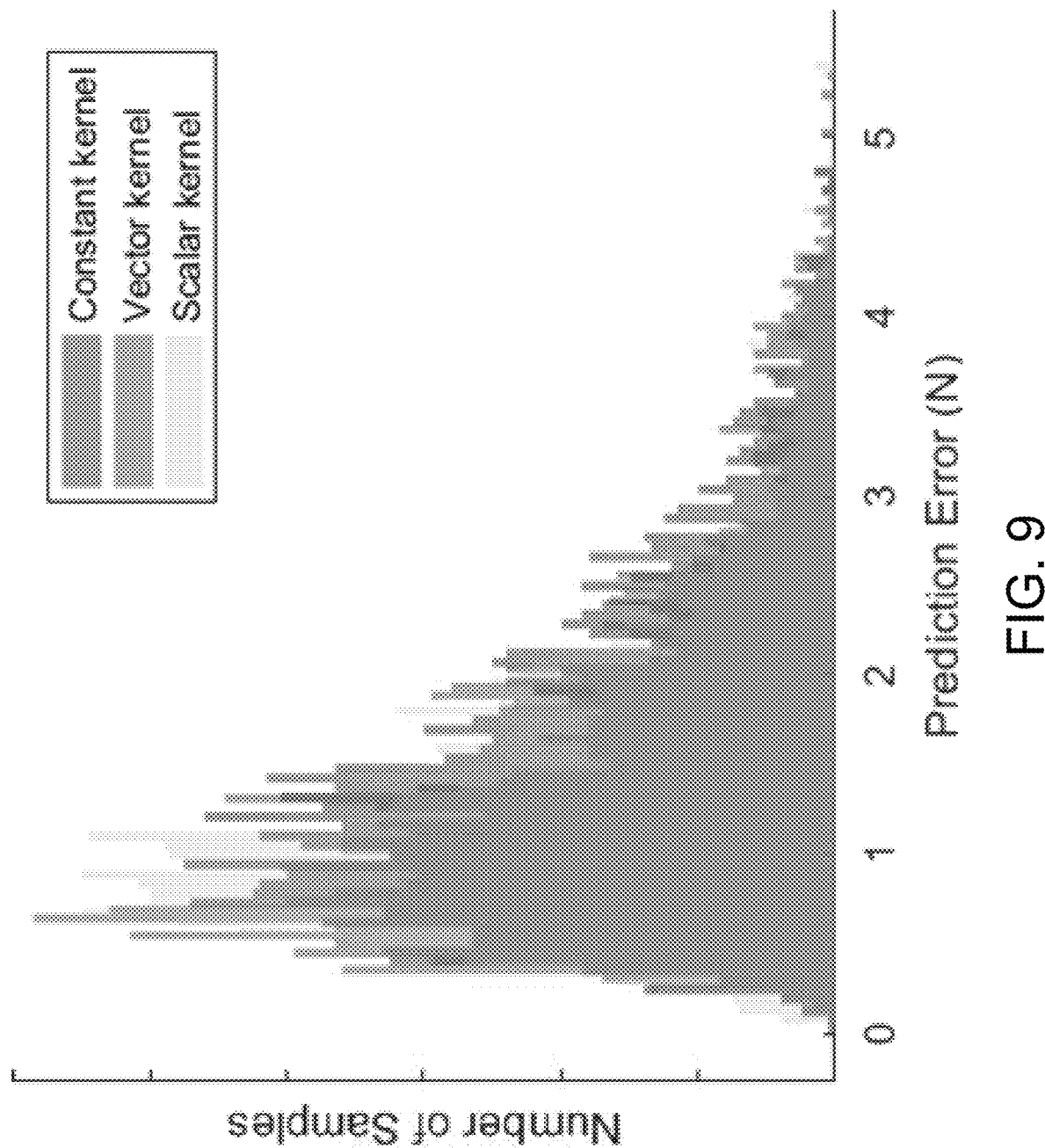
FIG. 9 illustrates a histogram of prediction error for each choice of kernel in a set point tracking test.

Note that the desired trajectory for this test had sudden changes in desired acceleration and velocity when the set point was moved. Thus, the composite velocity error is significantly higher than in the other tests. The learned kernel methods in both cases outperformed the constant kernel method in prediction error performance, but all three methods had similar tracking error performance, as seen in FIG. 5. A histogram of the prediction error at each time step the control input was calculated is shown in FIG. 9. FIG. 9 illustrates a histogram of prediction error for each choice of kernel in a set point tracking test. A slight skew of the constant kernel to higher prediction error can be seen as compared to the learned kernel methods. Though not shown in the plots here, for each choice of kernel, at several points throughout the test the input was completely saturated due to the discontinuities in the desired trajectory.

Figure 8 with Constant Wind

The third trajectory was a figure 8 pattern oriented up and down (z-axis) and towards and away from the wind tunnel (x-axis). This test used a fixed wind speed of 4.3 m/s. In each test, the drone was started from hovering near the center of the figure 8. Then, the wind tunnel was turned on and allowed to begin ramping up for 5 seconds, and the figure 8 trajectory was flown repeated for one minute. Each loop around the figure 8 took 8 seconds.

Figure 10:
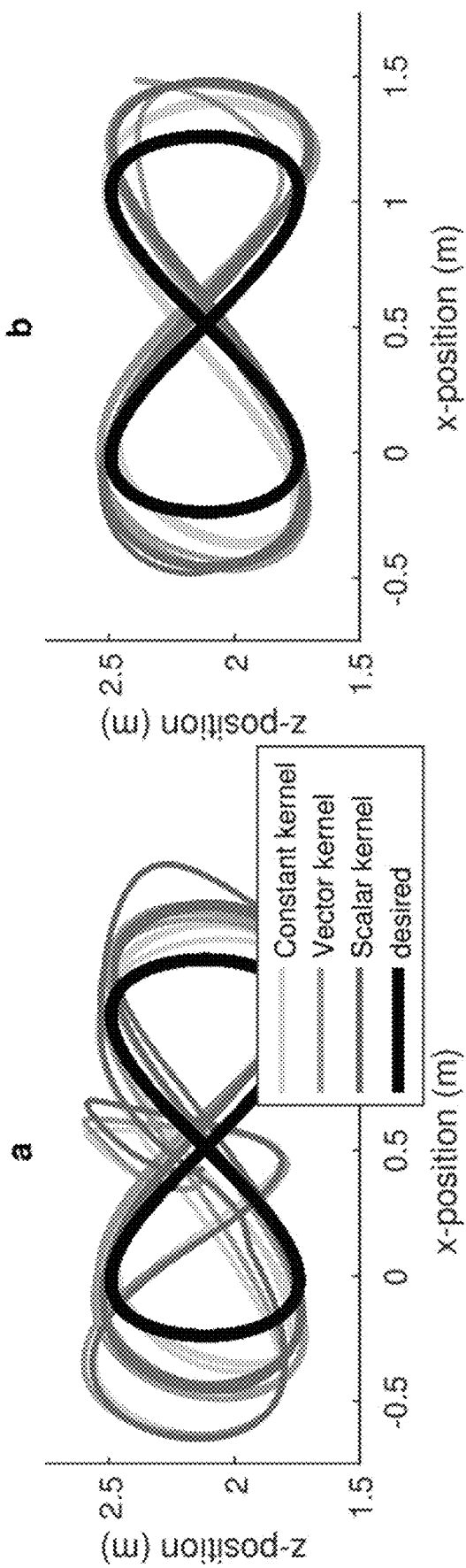
FIG. 10 illustrates a plot of estimated xz positions for multiple tests.

In this test, there is a striking difference between the prediction error performance of the learned kernels versus the constant kernel, as seen in FIG. 5. Despite the significantly better prediction error performance however, the velocity and position tracking error were still comparable between the three kernel choices, constant kernel, vector kernel, and scalar kernel. Examining the estimated xz position for each test, plotted in FIG. 10, can offer some additional insight. In plot (a), the first four laps around the figure 8 trajectory are shown. The parameters were initialized to 0 for each kernel, leading to very high initial tracking error. For each choice of kernel, the tracking error converged near some limit cycle behavior, as seen in plot (b). For each controller, the first one to two laps around the figure 8 show large tracking errors. However, after the parameters converge to a limit cycle value, each controller is unable to turn fast enough around the corners of the figure 8. This suggests that the tracking error in the attitude controller is causing the position tracking performance degradation. Two possible causes of this could be that the trajectory required quick turning speed, causing input saturation, or as a result of disturbance torques from aerodynamic effects associated with the wind.

Results

Three key error metrics are given for each kernel and trajectory in FIG. 5. The learned kernels were able to consistently outperform the constant kernel function in prediction error, suggesting that the learned kernels were able to capture part of the position and velocity dependence of the aerodynamic effects. This trend becomes more pronounced in the more dynamic trajectories. However, in each test, similar composite velocity and position tracking error is seen.

An integrated approach in accordance with a number of embodiments of the invention uses prior data to develop a drone controller capable of adapting to new and changing wind conditions. A meta-learning formulation to the offline training helped design kernel functions that can represent the dynamics effects observed in the training data. An adaptive controller in accordance with some embodiments of the invention can exponentially stabilize the system.

In experiments, the learned kernels were able to reduce prediction error performance over a constant kernel. However, this did not translate into improved tracking error performance. This could be caused by a combination of attitude tracking error, input saturation, and dependence of unmodeled dynamics on control input. Both input saturation and attitude tracking error were shown to lead to increased position tracking error. Different aerodynamic effects can cause a change in rotor thrust, usually modeled as a change in the coefficient of thrust.

As illustrated by the results, adaptive control (with either constant kernel or learned kernel) in accordance with various embodiments of the invention is able to effectively compensate for the unmodeled aerodynamic effects and adapt to changing conditions in real time.

Control System

Control System

Figure 11:
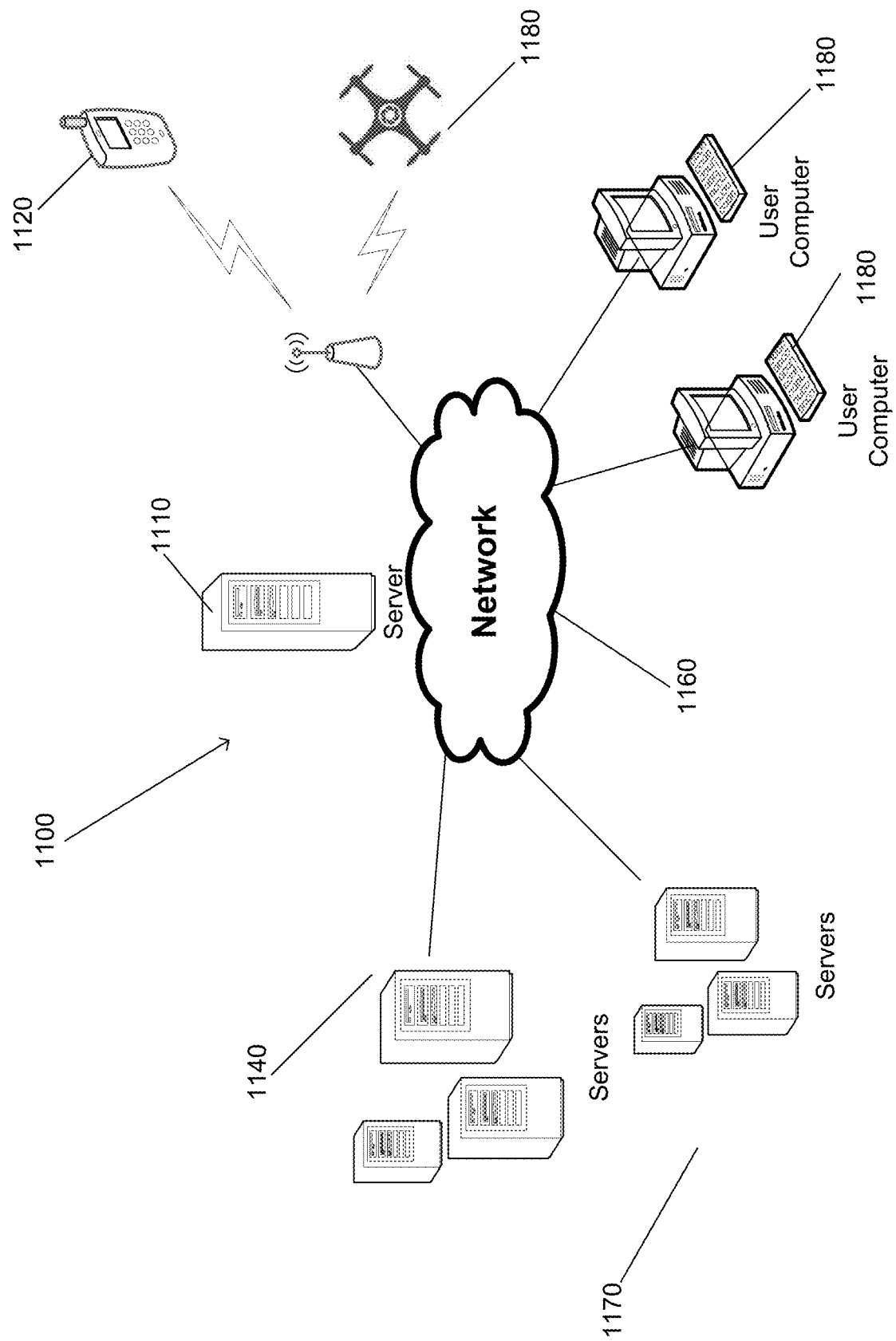
FIG. 11 illustrates a control system in accordance with an embodiment of the invention.

In certain embodiments, a control system operates entirely within a single device (e.g., a quadrotor with onboard compute). Control systems in accordance with several embodiments of the invention can distribute functions across multiple devices and services. A control system in accordance with some embodiments of the invention is shown in FIG. 11. Network 1100 includes a communications network 1160. The communications network 1160 is a network such as the Internet that allows devices connected to the network 1160 to communicate with other connected devices. Server systems 1110, 1140, and 1170 are connected to the network 1160. Each of the server systems 1110, 1140, and 1170 is a group of one or more servers communicatively connected to one another via internal networks that execute processes that provide cloud services to users over the network 1160. For purposes of this discussion, cloud services are one or more applications that are executed by one or more server systems to provide data and/or executable applications to devices over a network. The server systems 1110, 1140, and 1170 are shown each having three servers in the internal network. However, the server systems 1110, 1140 and 1170 may include any number of servers and any additional number of server systems may be connected to the network 1160 to provide cloud services. In accordance with various embodiments of this invention, a control system that uses systems and methods that train adaptive controllers and/or compute control inputs in accordance with an embodiment of the invention may be provided by a process being executed on a single server system and/or a group of server systems communicating over network 1160.

Users may use personal devices 1180 and 1120 that connect to the network 1160 to perform processes that train adaptive controllers and/or operate the controllers to control a device (e.g., quadrotors, drones, etc.) in accordance with various embodiments of the invention. In the shown embodiment, the personal devices 1180 are shown as desktop computers that are connected via a conventional "wired" connection to the network 1160. However, the personal device 1180 may be a desktop computer, a laptop computer, a smart television, an entertainment gaming console, or any other device that connects to the network 1160 via a "wired" connection. The mobile device 1120 connects to network 1160 using a wireless connection. A wireless connection is a connection that uses Radio Frequency (RF) signals, Infrared signals, or any other form of wireless signaling to connect to the network 1160. In FIG. 11, the mobile device 1120 is a mobile telephone. However, mobile device 1120 may be a mobile phone, Personal Digital Assistant (PDA), a tablet, a smartphone, or any other type of device that connects to network 1160 via wireless connection without departing from this invention.

As can readily be appreciated the specific computing system used to train adaptive controllers and/or operate the controllers is largely dependent upon the requirements of a given application and should not be considered as limited to any specific computing system(s) implementation.

Control Element

Figure 12:
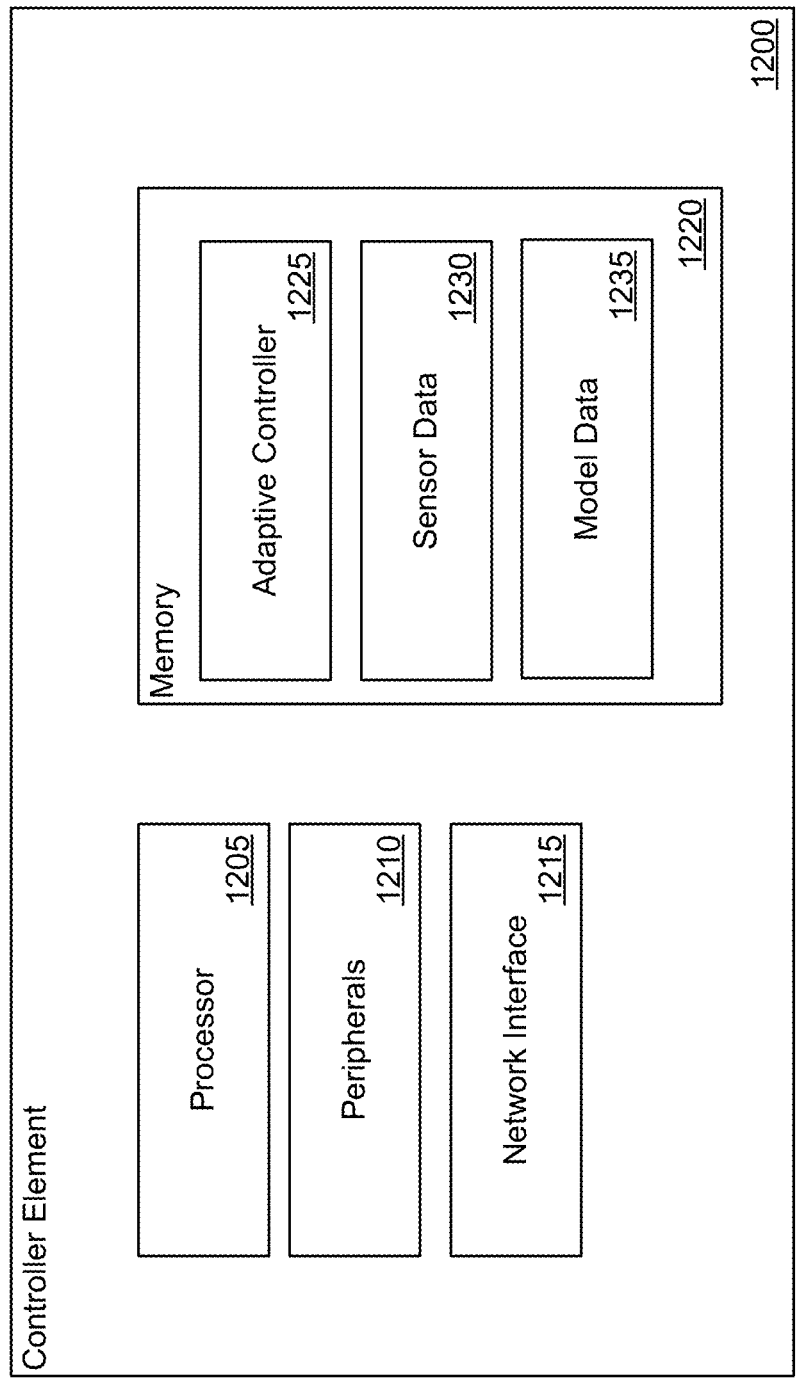
FIG. 12 illustrates an example of a control element that executes instructions to perform processes that control a plant in accordance with an embodiment of the invention.

An example of a control element that executes instructions to perform processes that control a plant in accordance with various embodiments of the invention is shown in FIG. 12. Control elements in accordance with many embodiments of the invention can include (but are not limited to) one or more of mobile devices, cameras, onboard computers, and/or other computing devices. Control element 1200 includes processor 1205, peripherals 1210, and memory 1220.

One skilled in the art will recognize that a particular control element may include other components that are omitted for brevity without departing from this invention. The processor 1205 can include (but is not limited to) a processor, microprocessor, controller, or a combination of processors, microprocessor, and/or controllers that performs instructions stored in the memory 1220 to manipulate data stored in the memory. Processor instructions can configure the processor 1205 to perform processes in accordance with certain embodiments of the invention.

Peripherals 1210 can include any of a variety of components for capturing data, such as (but not limited to) cameras, displays, and/or sensors. In a variety of embodiments, peripherals can be used to gather inputs and/or provide outputs. Network interface 1215 allows control element 1200 to transmit and receive data over a network based upon the instructions performed by processor 1205. Peripherals and/or network interfaces in accordance with many embodiments of the invention can be used to gather inputs that can be used to determine the state of a device (e.g., attitude, position, velocity, acceleration, etc.). Memory 1220 includes an adaptive controller 1225, sensor data 1230, and model data 1235.

Sensor data in accordance with many embodiments of the invention can include data recorded by sensors of a device, such as (but not limited to) image data, accelerometer data, gyroscope data, altimeter data, GPS data, etc. In several embodiments, model data can store various parameters and/or weights for dynamics models. Model data in accordance with many embodiments of the invention can be updated through offline training based on recorded training data and/or through online training based on operation of a device in an uncertain environment.

Although a specific example of a control element 1200 is illustrated in FIG. 12, any of a variety of control elements can be utilized to perform processes for a controller similar to those described herein as appropriate to the requirements of specific applications in accordance with embodiments of the invention.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method for training an adaptive controller, the method comprising:

receiving a set of training data comprising a plurality of training samples, each training sample comprising a state and a true uncertain effect value, wherein the state comprises vehicle dynamics data;

computing, for each training sample, an uncertain effect value based on the state;

computing, for each training sample, a set of one or more losses based on the true uncertain effect value and the computed uncertain effect value, wherein the set of one or more losses comprises a position tracking error; and updating the adaptive controller based on the computed set of losses, wherein the true uncertain effect value is a disturbance force caused by at least one of the group consisting of ground effects and wind conditions.

2. The method of claim 1, wherein the adaptive controller comprises a set of one or more deep neural network (DNNs).

3. The method of claim 2, wherein updating the adaptive controller comprises backpropagating the computed set of losses through the set of DNNs.

4. The method of claim 2, wherein updating the adaptive controller comprises updating at least one layer of the set of DNNs using spectrally normalized weight matrices.

5. The method of claim 2, wherein updating the adaptive controller comprises updating each layer of the set of DNNs using spectrally normalized weight matrices to constrain the Lipschitz constant of the set of DNNs.

6. The method of claim 1, wherein computing the set of losses further comprises computing a prediction error.

7. The method of claim 1, wherein the desired state comprises at least one of the group consisting of an attitude, a global position, and a velocity.

8. The method of claim 1, wherein computing an uncertain effect value of an environment comprises determining a set of kernel functions that approximate the uncertain effect value.

9. The method of claim 1, wherein:
the adaptive controller comprises a set of one or more deep neural networks (DNNs) with Rectified Linear Units (ReLU) activation;
computing an uncertain effect value of an environment comprises determining a set of kernel functions that approximate the uncertain effect value utilizing the set of DNNs; and
updating the adaptive controller comprises updating each layer of the set of DNNs using spectrally normalized weight matrices to constrain the Lipschitz constant of the set of DNNs.

10. A method for online adaptation of an adaptive controller, the method comprising:
receiving a set of inputs comprising a desired state corresponding to a multi-copter, wherein the desired state comprises a desired position of the multi-copter;
predicting uncertain effects using a model comprising a plurality of layers;
generating control inputs based on the predicted uncertain effects and based on the desired state;
receiving an updated state for the multi-copter, wherein the updated state for the multi-copter comprises a measured position of the multi-copter;
computing a set of one or more losses based on the updated state and the desired state, wherein the set of one or more losses comprises a position tracking error; and
updating a subset of the plurality of layers of the model based on the computed set of one or more losses,
wherein the uncertain effects comprise a disturbance force caused by at least one of the group consisting of ground effects and wind conditions.

11. The method of claim 10, wherein the model comprises a set of one or more deep neural networks (DNNs), wherein updating the model comprises backpropagating the computed set of losses through the set of DNNs.

12. The method of claim 11, wherein updating the model comprises updating weights for only one layer of the set of DNNs.

13. The method of claim 12, wherein updating weights for the only one layer comprises using spectrally normalized weight matrices.

14. The method of claim 11, wherein updating the model comprises updating each layer of the set of DNNs using spectrally normalized weight matrices to constrain the Lipschitz constant of the set of DNNs.

15. The method of claim 10, wherein computing the set of losses further comprises computing a prediction error.

16. The method of claim 10, wherein the input comprises a desired state for the quadrotor and a current state for the multi-copter, wherein the state for the multi-rotor comprises at least one of the group consisting of an attitude, a global position, and a velocity.

17. The method of claim 10, wherein predicting uncertain effects comprises determining a set of kernel functions that approximate the uncertain effects.

18. The method of claim 10, wherein:
the model comprises a set of one or more deep neural networks (DNNs) with Rectified Linear Units (ReLU) activation;
predicting an uncertain effects comprises determining a set of kernel functions that approximate the uncertain effect value utilizing the set of DNNs; and
updating the adaptive controller comprises updating each layer of the set of DNNs using spectrally normalized weight matrices to constrain the Lipschitz constant of the set of DNNs.

* * * * *